US012365839B2

(12) United States Patent
Patel et al.

(10) Patent No.: US 12,365,839 B2
(45) Date of Patent: Jul. 22, 2025

(54) INTEGRATION OF POLYMERIC WASTE CO-PROCESSING IN COKERS TO PRODUCE CIRCULAR CHEMICAL PRODUCTS FROM COKER GAS

(71) Applicant: ExxonMobil Chemical Patents Inc., Baytown, TX (US)

(72) Inventors: Bryan A. Patel, Jersey City, NJ (US); Brenda A Raich, Annandale, NJ (US); Steven M. Slack, Humble, TX (US); Derrick B Callander, Humble, TX (US); Eric M. Yucha, Spring, TX (US); Fritz A. Bernatz, Spring, TX (US); Rainer Kolb, Kingwood, TX (US); Alex S. Kolb, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 165 days.

(21) Appl. No.: 18/452,328

(22) Filed: Aug. 18, 2023

(65) Prior Publication Data

US 2024/0084199 A1    Mar. 14, 2024

Related U.S. Application Data

(60) Provisional application No. 63/374,944, filed on Sep. 8, 2022.

(51) Int. Cl.
*C10B 57/04*  (2006.01)
*C10B 57/00*  (2006.01)
*C10B 57/02*  (2006.01)

(52) U.S. Cl.
CPC ............ *C10B 57/04* (2013.01); *C10B 57/005* (2013.01); *C10B 57/02* (2013.01)

(58) Field of Classification Search
None
See application file for complete search history.

(56) References Cited

U.S. PATENT DOCUMENTS

| | | | |
|---|---|---|---|
| 4,118,281 A | 10/1978 | Yan | 201/2.5 |
| 4,851,601 A | 7/1989 | Fukuda et al. | 585/241 |
| (Continued) | | | |

FOREIGN PATENT DOCUMENTS

| | | | |
|---|---|---|---|
| CN | 1837331 | 7/2009 | C10G 1/00 |
| CN | 101230284 | 6/2013 | C08J 11/10 |
| (Continued) | | | |

OTHER PUBLICATIONS

Nchare, M. et al. (2012) "Co-Processing Vacuum Residue with Waste Plastics in a Delayed Coking Process: Kinetics and Modeling," *China Petro. Proc. and Petrochemical Tech.*, v.14(3), pp. 44-49.

*Primary Examiner* — Ali Z Fadhel

(57) ABSTRACT

Systems and methods are provided for integration of polymeric waste co-processing in cokers to produce circular chemical products from coker gas, including a method of producing circular chemical products comprising: providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %; and converting the coker gas into at least a polymer.

25 Claims, 5 Drawing Sheets

(56) References Cited

U.S. PATENT DOCUMENTS

| | | | |
|---|---|---|---|
| 5,705,724 A | 1/1998 | Collins et al. | 585/446 |
| 6,407,301 B1 | 6/2002 | Foley et al. | 585/650 |
| 6,652,737 B2 | 11/2003 | Touvelle et al. | 208/137 |
| 10,294,432 B2 | 5/2019 | Srivastava et al. | C10G 69/06 |
| 10,472,574 B2 | 11/2019 | Al-Ghamdi et al. | C10G 9/005 |
| 11,174,436 B2 | 11/2021 | Timken | C10B 53/07 |
| 11,174,437 B2 | 11/2021 | Timken | C10B 53/07 |
| 11,306,253 B2 | 4/2022 | Timken et al. | C10B 53/07 |
| 11,578,272 B1 * | 2/2023 | Akah | B01D 53/77 |
| 2005/0101814 A1 | 5/2005 | Foley et al. | 585/317 |
| 2008/0194900 A1 | 8/2008 | Bhirud | 585/648 |
| 2011/0005911 A1 | 1/2011 | Bernatz et al. | 201/20 |
| 2011/0005912 A1 | 1/2011 | Sabottke et al. | 201/20 |
| 2021/0087473 A1 * | 3/2021 | Pradeep | C10G 1/10 |
| 2021/0189248 A1 | 6/2021 | Timken | C10B 53/07 |
| 2021/0189249 A1 | 6/2021 | Timken | C10B 53/07 |
| 2021/0189250 A1 | 6/2021 | Timken | C10G 1/10 |
| 2021/0189251 A1 | 6/2021 | Timken | C10G 1/10 |
| 2021/0189252 A1 | 6/2021 | Timken | C10G 1/10 |
| 2021/0189253 A1 | 6/2021 | Timken | C10G 1/10 |
| 2021/0189254 A1 | 6/2021 | Timken | C10G 1/10 |
| 2021/0301209 A1 | 9/2021 | Timken et al. | C10B 53/07 |
| 2021/0301210 A1 | 9/2021 | Timken et al. | C10B 53/07 |
| 2021/0332299 A1 | 10/2021 | Timken | C10B 53/07 |
| 2021/0332300 A1 | 10/2021 | Timken | C10B 53/07 |
| 2022/0098490 A1 | 3/2022 | Abbott et al. | C10B 53/07 |
| 2022/0098491 A1 | 3/2022 | Abbott et al. | C10B 53/07 |
| 2022/0325189 A1 | 10/2022 | Shen et al. | C10G 21/003 |
| 2022/0333026 A1 | 10/2022 | Brown et al. | C10L 1/04 |
| 2022/0372375 A1 * | 11/2022 | Patel | C10B 55/10 |
| 2023/0039224 A1 * | 2/2023 | Bozzano | C10G 1/002 |
| 2023/0047205 A1 * | 2/2023 | Siddiqui | C10G 9/005 |
| 2023/0257660 A1 * | 8/2023 | Akah | B01J 8/1827 |
| | | | 585/241 |
| 2023/0287275 A1 * | 9/2023 | Gordo | C10G 9/005 |

FOREIGN PATENT DOCUMENTS

| | | | |
|---|---|---|---|
| EP | 3795656 | 3/2021 | C10B 53/07 |
| PL | 216590 | 4/2014 | C10G 1/10 |
| WO | WO1995-014069 | 5/1995 | C10G 9/14 |
| WO | WO2021-091724 | 5/2021 | C10B 53/07 |
| WO | WO2021-138593 | 7/2021 | A23J 1/00 |
| WO | WO2021-201932 | 10/2021 | C10B 53/07 |

\* cited by examiner

INTEGRATION OF POLYMERIC WASTE CO-PROCESSING IN COKERS TO PRODUCE CIRCULAR CHEMICAL PRODUCTS FROM COKER GAS

CROSS REFERENCE TO RELATED APPLICATIONS

This application claims the benefit of and priority to U.S. Provisional Application No. 63/374,944 filed Sep. 8, 2022, the disclosure of which is incorporated herein by reference.

FIELD

Systems and methods are provided for integration of polymeric waste co-processing in cokers to produce circular chemical products from coker naphtha.

BACKGROUND

Processing of polymeric waste is a subject of increasing importance. It is desirable to have a processing pathway that allows for production of circular chemical products. Specifically, it is desirable to produce circular chemical products through a processing pathway that includes polymeric waste recycling. Although dedicated processing systems could be used for polymeric waste recycling, such dedicated systems require substantial initial capital costs and a constant supply of waste feedstock. Thus, it is desirable to leverage an existing processing unit to be able to co-process polymeric waste into feedstock for production of circular chemical products.

SUMMARY

Disclosed herein is an example method of producing circular chemical products comprising: providing a coker gas that is at least partially derived from polymeric waste, wherein the coker gas has an olefin content of about 10 wt % to about 30 wt %, a sulfur content of about 0.5 wt % to about 5 wt, and a total halide content of about 1 wppm to about 150 wppm; and oxygen-containing compounds in an amount of about 0.5 wt % to about 15 wt %; and converting the coker gas into at least a polymer.

Further disclosed herein is an example method of producing circular chemical products comprising: providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %; recovering olefins from the coker gas; and polymerizing at least a portion of the olefins to form at least polyolefins.

These and other features and attributes of the disclosed methods and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
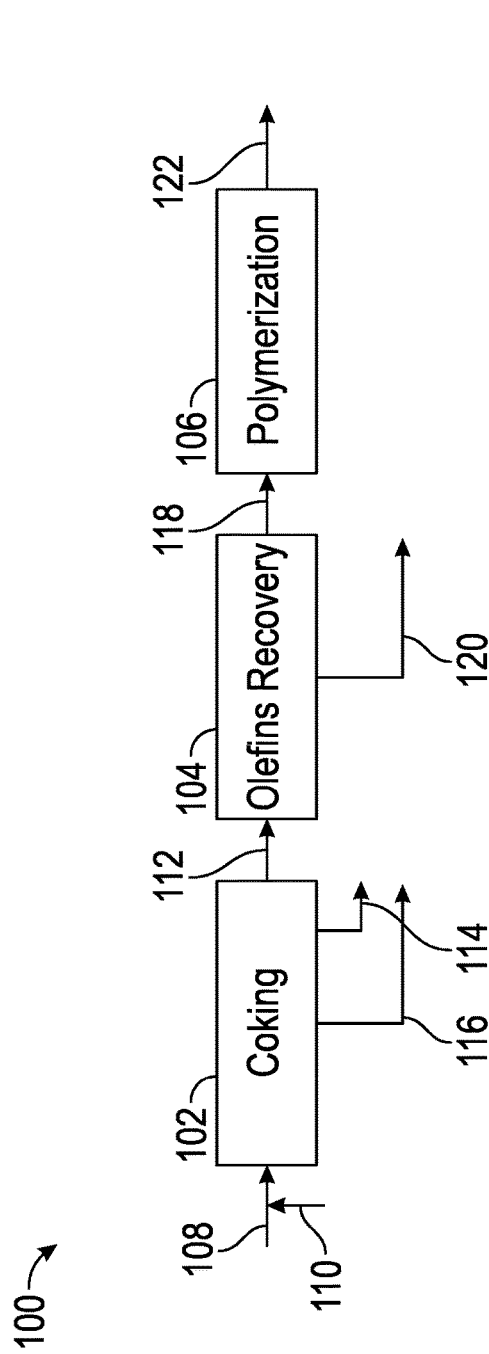
FIG. 1 is an illustrative depiction of an integrated process for production of circular chemical products from polymeric waste in accordance with certain embodiments of the present disclosure.

In various embodiments, systems and methods are provided for chemical recycling of polymeric waste, such as plastic waste. In some embodiments, the polymeric waste is co-processed in a coker to produce coker products, including coker gas. Example embodiments further include production of circular chemical products from the coker gas that is at least partially derived from polymeric waste. In some embodiments, the circular products include circular olefins, which can be further processed to produce circular polyolefins.

Circular chemical products are chemical products derived from polymeric waste wherein the molecules of the chemical product can be attributed to the polymers in the polymeric waste, such as by crediting, allocating offsetting for other hydrocarbons, and/or substituting for other hydrocarbons in a mass or energy balance for a system. Circular chemical products include circular monomers, circular aromatics, and circular polymers, among others. Polymers that are certified for their circularity by third party certification may be referred to as certified circular. One example of such a certification is the mass balance chain of custody method set forth by the International Sustainability and Carbon Certification.

Coker gas is a coker effluent fraction that is formed in the coker with a T90 distillation point of 40° C. or less. Coker gas is a mixture of many different hydrocarbons, including paraffins, olefins, and aromatics. Coker gas can include hydrocarbons ranging from 1 carbon atom to 5 carbon atoms. Coker gas can additionally include trace amounts of higher hydrocarbons (e.g., $C_6$), including benzene in gas. While coker gas is referred to a gas, it should be understood that the coker gas can be in liquid form, for example, depending on temperature and pressure, so long as the coker gas has a final boiling point of 100° C. or less.

Coker gas typically has a number of uses, including as a fuel and as a feedstock to other refinery units. Coker gas can be separated into various fractions, including one or more of a hydrogen fraction, a $C_1$ fraction, a $C_2$ fraction, a $C_3$, a $C_2$-$C_3$ fraction, and a $C_4$ fraction. As used herein, separated fractions do not necessarily contain 100% of the indicated species, but typically primarily include the indicated species, for example, containing at least 50 wt %, 80 wt %, 90 wt %, 95 wt %, 98 wt %, or more of the indicated species. In some embodiments, the coker gas may be separated into a pure fraction including at least 95 wt % of the indicated species. In some embodiments, the coker gas is separated to form a $C_3$-$C_4$ fraction in that it predominantly include $C_3$ and $C_4$ hydrocarbons, for example, typically including $C_3$ and $C_4$ hydrocarbons in amounts of 80 wt %, 90 wt % 95 wt %, 98 wt %, or more. The $C_3$-$C_4$ fraction is a gas at standard temperature pressure, but can be used and transferred as a liquid where it is stored under transfer.

In general, there are number of challenges to use of coker gas as a feedstock for producing chemical products due to among other things, its sulfur content, paraffin content, relatively low olefin content, and nitrogen content. For example, the conventional coker feedstocks are typically high in sulfur resulting in coker gas that is likewise high in sulfur, such as carbonyl sulfide, resulting in subsequent process reliability and product quality issues if used in production of subsequent chemical products, such as polymer. By way of further example, coker gas is typically high paraffin content and relatively low olefin content, specifically high in methane, resulting in undesirable economics for subsequent chemical production. By yet of further example, coker gas also has high methane content typically requiring separation (e.g., refrigeration) before subsequent processing. Accordingly, coker gas typically must undergo extensive pre-treatment, including caustic/amine treatment and/or water wash prior to chemical production, as well as fractionation for concentrating olefins prior to polymerization.

In one or more embodiments, the chemical products are produced from coker gas that is at least partially derived from polymeric waste. In some embodiments, the coker gas is produced by co-processing of polymeric waste with a conventional coker feedstock. Accordingly, at least a portion of the chemical products produced from the coker gas can be considered circular chemical products. Circular chemical products can have inherently higher value than chemical products produced from conventional coker gas, thus providing improved economics for chemical production from coker gas, for example, by having increased olefin content with reduced paraffin content. In addition, the co-processing of the polymeric waste should also provide coker gas with reduced sulfur and nitrogen content. Advantageously, the reduction in sulfur and paraffin content from co-processing of polymeric waste should increase the value of coker gas for subsequent chemical production, for example, by reducing the extent of pre-treatment and/or fractionation that may be required.

In addition, processing of the coker gas that is at least partially derived from polymeric waste to form chemical products presents unique challenges. For example, coker gas from polymeric gas has increased halides as compared to conventional coker gas. The increased halide content is from halides present in the polymeric waste (e.g., polyvinyl chloride, polyvinylidene chloride, fire retardants, inks, dyes, fluoropolymer processing aids, salts, etc.) that at least a portion of which ultimately end up in the coker gas. Additionally, the coker gas can also include increase levels of oxygen (e.g., carbon monoxide and carbon dioxide) from coking of polymer waste. For example, polymeric waste that includes certain plastics, such as polyethylene terephthalate, can lead to the presence of certain species, such as carbon monoxide, carbon dioxide, and acetaldehyde, for example, at levels that would not conventionally be found in coker gas. Accordingly, example embodiments include treatment of the coker gas for removal of these compounds, including halides, oxygen, and nitrogen. By way of example, the coker gas may undergo gas treatment for removal of one or more of these compounds. Examples of suitable gas treatments include, for example, absorption, hydrogenation, and fractionation.

Accordingly, present embodiments utilize the coker gas that is at least partially derived from polymeric waste as a feedstock for chemical production. This integration of a coker with chemical production allows the polymeric waste to be chemically recycled into chemical products, such as monomers (e.g., olefins), aromatics, polymers, synthetic elastomers and rubbers, plastic additives, epoxies, and resins, and specialty fluids, such as isopropyl alcohol, oxoalcohols, detergents, and lubricants.

Coker Gas Integration

FIG. 1 illustrates an example configuration for chemical recycling of polymeric waste that includes an integrated process 100 for coking of polymeric waste with polymer production. As illustrated, the integrated process 100 includes a coking stage 102, an olefins recovery stage 104, and a polymerization stage 106.

In FIG. 1, a waste feedstock 108 and one or more conventional coking feedstocks 110 are fed into the coking stage 102. The waste feedstock 108 includes polymeric waste. The one or more conventional coking feedstocks 110 include, for example, a heavy oil with a T10 distillation point of 343° C. or greater, such as petroleum vacuum resid. Coking stage 102 corresponds to any suitable coking for coking the polymeric waste, including a delayed coker, a fluidized coker, flexicoker, or a combination thereof. In the coking stage 102, the combined feedstock of the waste feedstock 108 and the one or more conventional coking feedstocks 110 are processed to form at least a coking effluent. In the example shown in FIG. 1, the coking effluent can be separated to form a coker gas fraction 112 and a coker liquids fraction 114, which may be further separated, for example, into coker naphtha and coker gas oil fractions. In some embodiments, one or more of the fractions from the coking stage 102 may be combined. In some embodiments, one or more additional fractions may be produced in the coking stage 102. A coke product 116 is also shown, but it should be understood that the coke product 116 is typically withdrawn from a coker separately from the coker effluent or gasified in a flexicoker, for example.

The coker gas fraction 112 including coker gas that is at least partially derived from polymeric waste can then be passed into the olefins recovery stage 104. In the example shown in FIG. 1, all of the coker gas fraction 112 from the coking stage 102 is passed into the olefins recovery stage 104. In other embodiments, a portion of the coker gas fraction 112 from the coking stage 102 is used for another purpose with another portion of the coker gas fraction 112 passed to the olefins recovery stage 104. In some embodiments, the coker gas fraction 112 (or portion thereof) may be treated, for example, to at least partially remove one or more components (e.g., halides, oxygen, nitrogen, methane) before (or during) the olefins recovery stage 104. For example, at least a portion of the methane may be removed from the coker gas fraction 112 in an optional refinery gas recovery stage (not shown) with the coker gas fraction 112 fed to the olefins recovery stage 104 being a $C_2$-$C_4$ fraction. Alternatively, the refinery recovery stage can separate the coker gas fraction 112 into one or more of a $C_1$ fraction, a $C_2$ fraction, a $C_3$ fraction, a $C_4$ fraction or mixtures of the $C_2$, $C_3$, and/or $C_4$ fractions, wherein one or more of the fractions are then passed to the olefins recovery stage 104. In some embodiments, the coker gas fraction 112 may be further separated to concentrate olefins, such that $C_2$ olefin fraction, a $C_3$ olefin fraction, and/or a $C_4$ olefin fraction may be recovered for subsequent processing. By separation into the various hydrocarbon fractions, the hydrocarbon fractions can then be allowed to enter more efficient locations in the olefins recovery stage 104 while also removing the fuel gas (methane) so it does not go through the subsequent processing steps. In the olefins recovery stage 104, olefins are separated from the coker gas fraction 112 to form at least an olefins stream 118 and an additional product stream 120. The olefins stream 118 does not necessarily include 100% olefins but should generally include a substantial portion of olefins, for example, 50 wt %, 60 wt %, 80 wt %, 90 wt %, 95 wt %, or more of olefins. Separation of the olefins from the coker gas fraction 112 can occur in one or more vessels and/or one or more different operations. For example, the coker gas fraction 112 can be fractionated or otherwise separated to form at least the olefins stream 118 and additional products stream 120. At least a portion of the olefins separated from the coker gas fraction 112 include circular olefins, such as circular ethylene, circular propylene, and circular butylene (e.g., circular isobutylene, circulate 1-butene), and circular butadiene, among others. Circular olefins can be attributed, for example, to polymers in the polymeric waste. In some embodiments, the olefins stream 118 can be separated into one or more additional fractions, such as an ethylene fraction including circular ethylene, a butylene fraction including circular butylene, a propylene fraction including circular propylene, and/or a butadiene fraction including circular butadiene, among others. At least a portion of the products in the additional product stream 120 include circular products, such as aromatics, including benzene, toluene, xylene, and styrene. Additional circular products include, for example, cyclohexane, cyclopentadiene, and dicyclopentadiene. In some embodiments, the additional product stream 120 is separated into one or more fractions, such as an aromatics stream.

The olefins stream 118 from the olefins recovery stage 104 can then be passed to a polymerization stage 106 for production of chemical products, such as polymer products 122. For example, an ethylene fraction, propylene fraction, and/or butylene fraction can be separately passed to a polymerization stage. Polymerization stage 106 corresponds to any suitable polymerization process for bonding two or more olefins, including chain growth propagation, step-growth, and condensation polymerization. The polymerization processes may be in the solution, slurry, or gas-phase, among others. In some embodiments, the polymer products 122 include polyolefins. At least a portion of the polymer products 122 produced in the polymerization stage 106 include circular polymers, such as circular polyethylene, circular polypropylene, circular polybutylene (e.g., circular polyisobutylene), circular polybutadiene, circular polyethylene terephthalate, circular polystyrene, circular polycarbonate, and circular polycaprolactam, among others. Circular polymers can be attributed, for example, to polymers in the polymeric waste. In the example shown in FIG. 1, all of the olefins stream 118 from the olefins recovery stage 104 is passed into the polymerization stage 106. In other embodiments, a portion of the olefins stream 118 from the olefins recovery stage 104 is used for another purpose with another portion of the olefins stream 118 passed to the polymerization stage 106.

Figure 2:
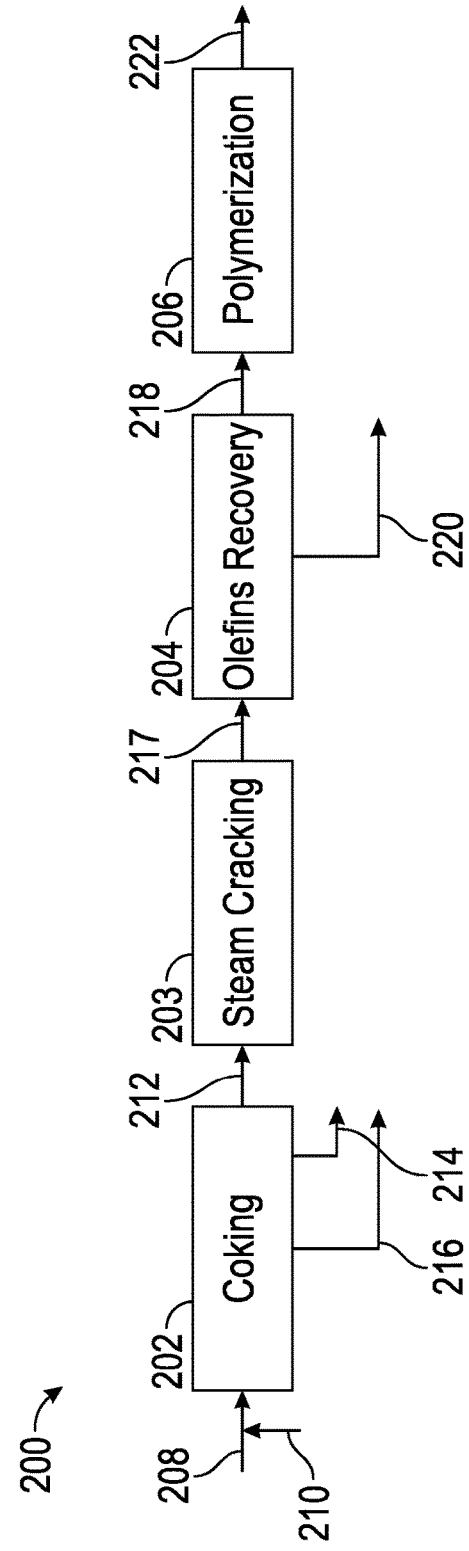
FIG. 2 is another illustrative depiction of an integrated process for production of circular chemical products from polymeric waste in accordance with certain embodiments of the present disclosure.

FIG. 2 illustrates another example configuration for chemical recycling of polymeric waste that includes an integrated process 200 for coking of polymeric waste with polymer production. The embodiment of FIG. 2 is similar to FIG. 1 except the integrated process 200 further includes a steam cracking stage 203. As illustrated, the integrated process 200 includes a coking stage 202, a steam cracking stage 203, an olefins recovery stage 204, and a polymerization stage 206.

In FIG. 2, a waste feedstock 208 and one or more conventional coking feedstocks 210 are fed into the coking stage 202. The waste feedstock 208 includes polymeric waste. The one or more conventional coking feedstocks 210 include, for example, a heavy oil with a T10 distillation point of 343° C. or greater, such as petroleum vacuum resid. Coking stage 202 corresponds to any suitable coking for coking the polymeric waste, including a delayed coker, a fluidized coker, flexicoker, or a combination thereof. In the coking stage 202, the combined feedstock of the waste feedstock 208 and the one or more conventional coking feedstocks 210 are processed to form at least a coking effluent. In the example shown in FIG. 2, the coking effluent can be separated to form a coker gas fraction 212 and a coker liquids fraction 214, which may be further separated, for example, into coker naphtha and coker gas oil fractions. In some embodiments, one or more of the fractions from the coking stage 202 may be combined. In some embodiments, one or more additional fractions may be produced in the coking stage 202. A coke product 216 is also shown, but it should be understood that the coke product 216 is typically withdrawn from a coker separately from the coker effluent or gasified in a flexicoker, for example.

The coker gas fraction 212 including coker gas that is at least partially derived from polymeric waste can then be passed into the steam cracking stage 203. Steam cracking stage 203 corresponds to any suitable process for steam cracking saturated hydrocarbons into small hydrocarbons, including olefins such as ethylene, propylene, butylene (e.g., isobutylene), and butadiene, among others. In the example shown in FIG. 2, all of the coker gas fraction 212 from the coking stage 202 is passed into the steam cracking stage 203. In other embodiments, a portion of the coker gas fraction 212 from the coking stage 202 is used for another purpose, such as fuel, with another portion of the coker gas fraction 212 passed to the steam cracking stage 203. In some embodiments, the coker gas fraction 212 can be further separated into fractions, such as $C_2$ fraction, $C_3$ fraction, $C_4$ fraction, and $C_2$-$C_3$ fraction, among others, which can be independently sent to the steam cracking stage 203. For example, the coker gas fraction 212 sent to the steam cracking stage 203 is intended to encompass a mixed stream from the coking stage 202 or a separation fraction thereof. In some embodiments, at least a portion of the methane may be removed from the coker gas fraction 212 in an optional refinery gas recovery stage (not shown) with the coker gas fraction 212 fed to the steam cracking stage 203 being a $C_2$-$C_4$ fraction. Alternatively, the refinery gas recovery stage can separate the coker gas fraction 112 into one or more of a $C_1$ fraction, a $C_2$ fraction, a $C_3$ fraction, a $C_4$ fraction or mixtures of the $C_2$, $C_3$, and/or $C_4$ fractions, wherein one or more of the fractions are then passed to the olefins recovery stage 104. By separation of the coker gas fraction 212 into various hydrocarbon fractions, the hydrocarbon fractions can be cracked at their optimal severity while also removing the fuel gas (methane) so it does not take up space in the cracking furnace. These separations may occur in one or more vessels (not shown).

After the steam cracking stage 203, the steam cracking effluent 217 can be passed to an olefins recovery stage 204. In the olefins recovery stage 204, olefins are separated from the steam cracking effluent 217 to form at least an olefins stream 218 and an additional product stream 220. It should be understood that separation of the olefins the steam cracking effluent 217 can occur in one or more vessels and/or one or more different operations. For example, the steam cracking effluent 217 can be fractionated or otherwise separated to form at least the olefins stream 218 and additional products stream 220. At least a portion of the olefins separated from the steam cracking effluent 217 include circular olefins, such as circular ethylene, circular propylene, and circular butylene (e.g., circular butylene), and circular butadiene, among others. Circular olefins can be attributed, for example, to polymers in the polymeric waste. In some embodiments, the olefins stream 218 can be separated into one or more additional fractions, such as an ethylene fraction including circular ethylene, a butylene fraction including circular butylene, a propylene fraction including circular propylene, and/or a butadiene fraction including circular butadiene, among others. At least a portion of the products in the additional product stream 220 include circular products, such as aromatics, including benzene, toluene, xylene, and styrene. Additional circular products include, for example, cyclohexane, cyclopentadiene, and dicyclopentadiene. In some embodiments, the additional product stream 220 is separated into one or more fractions, such as an aromatics stream.

The olefins stream 218 from the olefins recovery stage 204 can then be passed to a polymerization stage 206 for production of chemical products, such as polymer products 222. For example, an ethylene fraction, propylene fraction, and/or butylene fraction can be separately passed to a polymerization stage. Polymerization stage 206 corresponds to any suitable polymerization process for bonding two or more olefins, including chain growth propagation, step-growth, and condensation polymerization. The polymerization processes may be in the solution, slurry, or gas-phase, among others. In some embodiments, the polymer products 222 include polyolefins. At least a portion of the polymer products 222 produced in the polymerization stage 206 include circular polymers, such as circular polyethylene, circular polypropylene, circular polybutylene (e.g., circular polyisobutylene), circular polybutadiene, circular polyethylene terephthalate, circular polystyrene, circular polycarbonate, and circular polycaprolactam, among others. Circular polymers can be attributed, for example, to polymers in the polymeric waste. In the example shown in FIG. 2, all of the olefins stream 218 from the olefins recover stage 204 is passed into the polymerization stage 206. In other embodiments, a portion of the olefins stream 218 from the olefins recovery stage 204 is used for another purpose with another portion of the olefins stream 218 passed to the polymerization stage 206.

Figure 3:
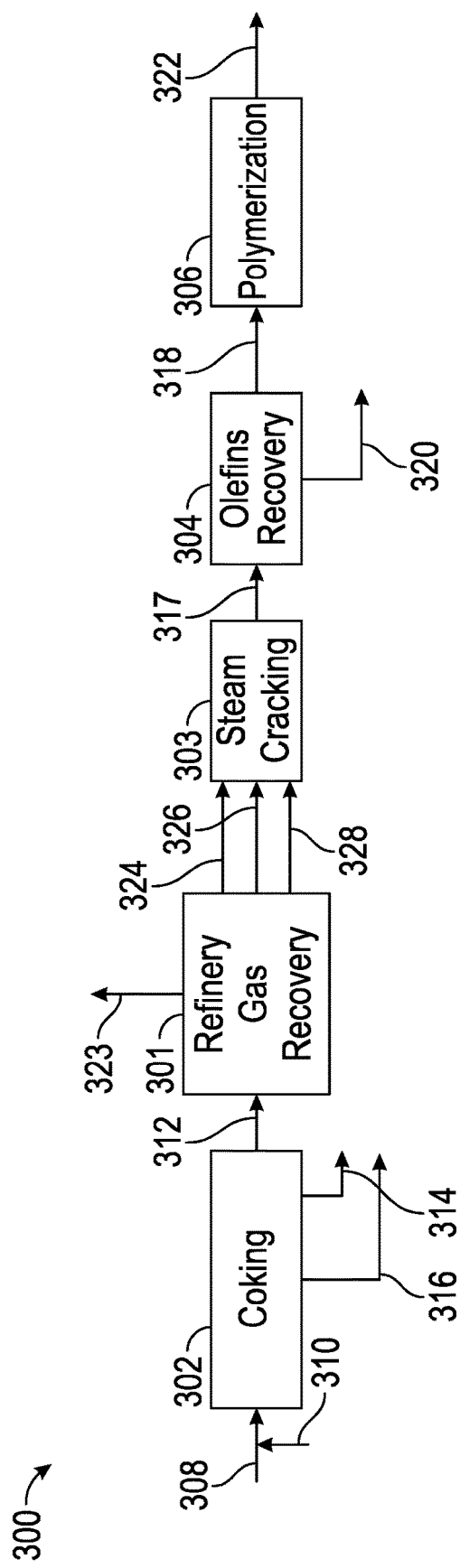
FIG. 3 is another illustrative depiction of an integrated process for production of circular chemical products from polymeric waste in accordance with certain embodiments of the present disclosure.

FIG. 3 illustrates another example configuration for chemical recycling of polymeric waste that includes an integrated process 300 for coking of polymeric waste with polymer production. The embodiment of FIG. 3 is similar to FIG. 2 except for the inclusion of refinery recovery stage 301 for separation of the coker gas fraction 312 into various fractions of coker gas. As illustrated, the integrated process 300 includes a coking stage 302, a refinery recovery stage 301, a steam cracking stage 303, an olefins recovery stage 304, and a polymerization stage 306.

In FIG. 3, a waste feedstock 308 and one or more conventional coking feedstocks 310 are fed into the coking stage 302. The waste feedstock 308 includes polymeric waste. The one or more conventional coking feedstocks 310 include, for example, a heavy oil with a T10 distillation point of 343° C. or greater, such as petroleum vacuum resid. Coking stage 302 corresponds to any suitable coking for coking the polymeric waste, including a delayed coker, a fluidized coker, flexicoker, or a combination thereof. In the coking stage 302, the combined feedstock of the waste feedstock 308 and the one or more conventional coking feedstocks 310 are processed to form at least a coking effluent. In the example shown in FIG. 3, the coking effluent can be separated to form a coker gas fraction 312 and a coker liquids fraction 314, which may be further separated, for example, into coker naphtha and coker gas oil fractions. In some embodiments, one or more of the fractions from the coking stage 302 may be combined. In some embodiments, one or more additional fractions may be produced in the coking stage 302. These separations may occur in one or more vessels (not shown). A coke product 316 is also shown, but it should be understood that the coke product 316 is typically withdrawn from a coker separately from the coker effluent or gasified in a flexicoker, for example.

The coker gas fraction 312 including coker gas that is at least partially derived from polymeric waste can then be passed into the refinery gas recovery stage 301. Refinery gas recovery stage 301 corresponds to any suitable process for separation of the refinery gas into one or more hydrocarbon fractions, including fractionation, cryogenic separation, and membrane separation. Refinery gas recovery stage 301 can also include corresponding gas compression as well as gas treatment, including caustic/amine treating, water wash, drying, and adsorption (e.g., mercury and carbonyl sulfide). Inclusion of the refinery gas recovery stage 301 can be beneficial, for example, by separation of methane thus preventing this inert fuel gas from taking up space in the subsequent process steps while also separating into various fraction can allow the various hydrocarbon fractions to be cracked at their optimal severity. The refinery gas recovery stage 301 separates the coker gas fraction 312 into one or more hydrocarbon fractions, including a $C_1$ fraction 323, a $C_2$ fraction 324, a $C_3$ fraction 326, and a $C_4$ fraction 328. In some embodiments, one or more of these fractions may be combined, for example, the $C_2$ fraction 324 and $C_3$ fraction 326 and/or the $C_3$ fraction 326 and $C_4$ fraction 328 may be combined. The $C_1$ fraction 323 may be used for fuel or a feed, for example, in other refinery operations while the other fractions may be used for further chemical processing. In some embodiments, the $C_1$ fraction 323 can be used in steam methane reforming or auto thermal reforming for production of syngas, for example, including hydrogen. In the example shown in FIG. 3, all of the coker gas fraction 312 from the coking stage 302 is passed into the refinery gas recovery stage 301. In other embodiments, a portion of the coker gas fraction 312 from the coking stage 302 is used for another purpose, such as fuel, with another portion of the coker gas fraction 312 passed to the refinery gas recovery stage 301.

The $C_2$ fraction 324, $C_3$ fraction 326, and/or $C_4$ fraction including $C_2$-$C_4$ hydrocarbons that are at least partially derived from polymeric waste can then be passed into the steam cracking stage 303. Steam cracking stage 303 corresponds to any suitable process for steam cracking saturated hydrocarbons into small hydrocarbons, including olefins such as ethylene, propylene, butylene (e.g., isobutylene), and butadiene, among others. By feeding the various hydrocarbon fractions rather than a mixed stream, the hydrocarbon fractions can be cracked at their optimal severity. In the example shown in FIG. 3, all of the hydrocarbon fractions from the refinery gas recovery stage 301 are passed into the steam cracking stage 303. In other embodiments, a portion of one or more of the hydrocarbon fractions are used for another purpose, with another portion of the hydrocarbon fraction(s) passed to the steam cracking stage 303.

After the steam cracking stage 303, the steam cracking effluent 317 can be passed to an olefins recovery stage 304. In the olefins recovery stage 304, olefins are separated from the steam cracking effluent 317 to form at least an olefins stream 318 and an additional product stream 320. It should be understood that separation of the olefins from the steam cracking effluent 317 can occur in one or more vessels and/or one or more different operations. For example the stream cracking effluent 317 can be fractionated or otherwise separated to form at least the olefins stream 318 and additional products stream 320. At least a portion of the olefins separated from the steam cracking effluent 317 circular olefins, such as circular ethylene, circular propylene, and circular butylene (e.g., circular butylene), and circular butadiene, among others. Circular olefins can be attributed, for example, to polymers in the polymeric waste. In some embodiments, the olefins stream 318 can be separated into one or more additional fractions, such as an ethylene fraction including circular ethylene, a butylene fraction including circular butylene, a propylene fraction including circular propylene, and/or a butadiene fraction including circular butadiene, among others. At least a portion of the products in the additional product stream 320 include circular products, such as aromatics, including benzene, toluene, xylene, and styrene. Additional circular products include, for example, cyclohexane, cyclopentadiene, and dicyclopentadiene. In some embodiments, the additional product stream 320 is separated into one or more fractions, such as an aromatics stream.

The olefins stream 318 from the olefins recovery stage 304 can then be passed to a polymerization stage 306 for production of chemical products, such as polymer products 322. For example, an ethylene fraction, propylene fraction, and/or butylene fraction can be separately passed to a polymerization stage. Polymerization stage 306 corresponds to any suitable polymerization process for bonding two or more olefins, including chain growth propagation, step-growth, and condensation polymerization. The polymerization processes may be in the solution, slurry, or gas-phase, among others. In some embodiments, the polymer products 322 include polyolefins. At least a portion of the polymer products 322 produced in the polymerization stage 306 include circular polymers, such as circular polyethylene, circular polypropylene, circular polybutylene (e.g., circular polyisobutylene), circular polybutadiene, circular polyethylene terephthalate, circular polystyrene, circular polycarbonate, and circular polycaprolactam, among others. Circular polymers can be attributed, for example, to polymers in the polymeric waste. In the example shown in FIG. 3, all of the olefins stream 318 from the olefins recover stage 304 is passed into the polymerization stage 306. In other embodiments, a portion of the olefins stream 318 from the olefins recovery stage 304 is used for another purpose with another portion of the olefins stream 318 passed to the polymerization stage 306.

Figure 4:
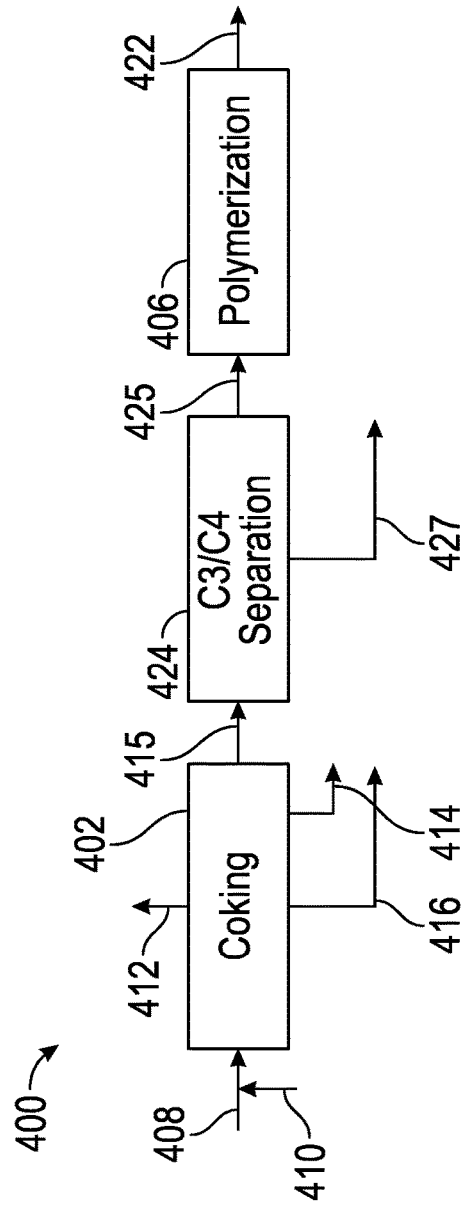
FIG. 4 is another illustrative depiction of an integrated process for production of circular chemical products from polymeric waste in accordance with certain embodiments of the present disclosure.

FIG. 4 illustrates another example configuration for chemical recycling of polymeric waste that includes an integrated process 400 for coking of polymeric waste with polymer production. As illustrated, the integrated process 400 includes a coking stage 402, a $C_3/C_4$ separation stage 424, and a polymerization stage 306.

In FIG. 4, a waste feedstock 408 and one or more conventional coking feedstocks 410 are fed into the coking stage 402. The waste feedstock 408 includes polymeric waste. The one or more conventional coking feedstocks 410 include, for example, a heavy oil with a T10 distillation point of 343° C. or greater, such as petroleum vacuum resid. Coking stage 402 corresponds to any suitable coking for coking the polymeric waste, including a delayed coker, a fluidized coker, flexicoker, or a combination thereof. In the coking stage 402, the combined feedstock of the waste feedstock 408 and the one or more conventional coking feedstocks 410 are processed to form at least a coking effluent. In the example shown in FIG. 4, the coking effluent can be separated to form a coker gas fraction 412 and a coker liquids fraction 414, which may be further separated, for example, into coker naphtha and coker gas oil fractions. In some embodiments, one or more of the fractions from the coking 402 may be combined. In some embodiments, one or more additional fractions may be produced in the coking stage 402. As illustrated, the coker gas fraction 412 may be further separated to form a $C_3$-$C_4$ fraction 415 including at $C_3$ and $C_4$ hydrocarbons in an amount of at least 50 wt %. These separations may occur in one or more vessels (not shown). A coke product 416 is also shown, but it should be understood that the coke product 416 is typically withdrawn from a coker separately from the coker effluent or gasified in a flexicoker, for example.

While not shown, the $C_3$-$C_4$ fraction 415 can be separated from the remainder of the coker gas in a refinery gas recovery unit (e.g., refinery gas recovery unit 301 on FIG. 3). For example, methane and $C_2$ fractions can also be produced. The methane fraction can be used, for example, as fuel gas or a feed, for example, to other refinery operations. The $C_2$ fraction can be used as a feed for subsequent chemical processing, for example, as a feed to an olefins recovery unit (e.g., olefins recovery 104 on FIG. 1) with subsequent polymerization of at least a portion of the recovered olefins.

The $C_3$-$C_4$ fraction 415 including $C_3$ and $C_4$ hydrocarbons that are at least partially derived from polymeric waste can then be passed into a $C_3/C_4$ separation stage 427 for separation into a $C_3$ fraction 425 and a $C_4$ fraction 427. The $C_3$ fraction 425 includes coker propane and coker propylene at least partially derived from polymer waste, including circular propane and circular propylene. The $C_4$ fraction 427 includes coker butane and coker butylene at least partially derived from coker waste, including circular butane and circular butylene. The $C_3/C_4$ separation stage 424 generally does not provide for 100% separation but should separate the olefins such that the $C_3$ fraction 425 includes primarily $C_3$ hydrocarbons, including propylene, in an amount of at least 90 wt %, at least 95 wt %, at least 98 wt %, or at least 99 wt %. In some embodiments, the $C_3/C_4$ separation stage 424 may further include additional separation, such that $C_3$ fraction 425 is a $C_3$ olefin stream including propylene in an amount of at least 60 wt %, at least 80 wt %, at least 90 wt %, at least 95 wt %, at least 99 wt %, or at least 99.5 wt %. These separations can occur in one or more stages and in one or more vessels. Any suitable process may be used in the $C_3/C_4$ separation stage 427 including a $C_3$-$C_4$ splitter with a tower, reboiler, and condenser, among other equipment.

The $C_3$ fraction 425 from the $C_3/C_4$ separation stage 424 can then be passed to a polymerization stage 406 for production of chemical products, such as polymer products 422. Polymerization stage 406 corresponds to any suitable polymerization process for bonding two or more olefins, including chain growth propagation, step-growth, and condensation polymerization. The polymerization processes may be in the solution, slurry, or gas-phase, among others. In some embodiments, the polymer products 422 include polyolefins. At least a portion of the polymer products 422 produced in the polymerization stage 406 include circular polypropylene, among others. Additional products can include specialty fluids and chemical intermediates, such as $C_6$-$C_{16}$ olefins (e.g., hexene, octene), oxo-alcohols, isopropyl alcohols, and plastomers (e.g., ethylene-propylene-based polymers). Circular polymers can be attributed, for example, to polymers in the polymeric waste. In the example shown in FIG. 4, all of the $C_3$ fraction 425 from the $C_3$/$C_4$ separation stage 424 is passed into the polymerization stage 406. In other embodiments, a portion of the $C_3$ fraction 425 from the $C_3$/$C_4$ separation stage 424 is used for another purpose with another portion of the $C_3$ fraction 425 passed to the polymerization stage 406.

Figure 5:
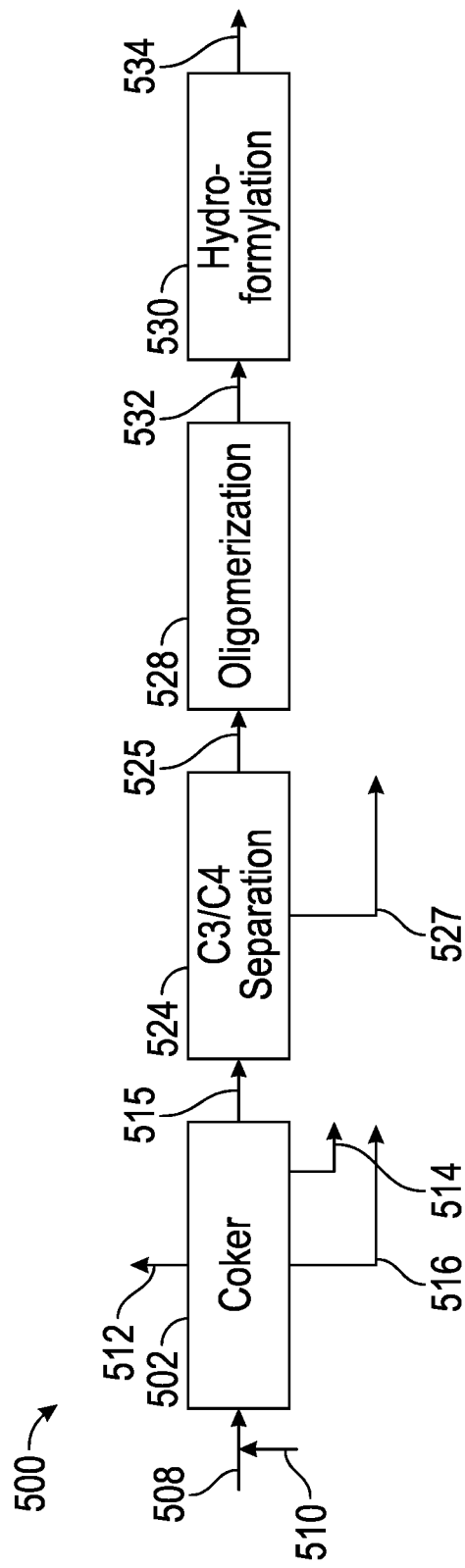
FIG. 5 is another illustrative depiction of an integrated process for production of circular chemical products from polymeric waste in accordance with certain embodiments of the present disclosure.

FIG. 5 illustrates another example configuration for chemical recycling of polymeric waste that includes an integrated process 500 for coking of polymeric waste with polymer production. As illustrated, the integrated process 500 includes a coking stage 502, a $C_3$/$C_4$ separations stage 524, an oligomerization stage 528, and a hydroformylation stage 530.

In FIG. 5, a waste feedstock 508 and one or more conventional coking feedstocks 510 are fed into the coking stage 502. The waste feedstock 508 includes polymeric waste. The one or more conventional coking feedstocks 510 include, for example, a heavy oil with a T10 distillation point of 343° C. or greater, such as petroleum vacuum resid. Coking stage 502 corresponds to any suitable coking for coking the polymeric waste, including a delayed coker, a fluidized coker, flexicoker, or a combination thereof. In the coking stage 502, the combined feedstock of the waste feedstock 508 and the one or more conventional coking feedstocks 510 are processed to form at least a coking effluent. In the example shown in FIG. 5, the coking effluent can be separated to form a coker gas fraction 512 and a coker liquids fraction 514, which may be further separated, for example, into coker naphtha and coker gas oil fractions. In some embodiments, one or more of the fractions from the coking 502 may be combined. In some embodiments, one or more additional fractions may be produced in the coking stage 502. As illustrated, the coker gas fraction 512 may be further separated to form a $C_3$-$C_4$ fraction 515 including $C_3$ and $C_4$ hydrocarbons in an amount of at least 50 wt %. These separations may occur in one or more vessels (not shown). A coke product 516 is also shown, but it should be understood that the coke product 516 is typically withdrawn from a coker separately from the coker effluent or gasified in a flexicoker, for example.

While not shown, the $C_3$-$C_4$ fraction 515 can be separated from the remainder of the coker gas in a refinery gas recovery unit (e.g., refinery gas recovery unit 301 on FIG. 3). For example, methane and $C_2$ fractions can also be produced. The methane fraction can be used, for example, as fuel gas or a feed, for example, to other refinery operations. The $C_2$ fraction can be used as a feed for subsequent chemical processing, for example, as a feed to an olefins recovery unit (e.g., olefins recovery 104 on FIG. 1) with subsequent polymerization of at least a portion of the recovered olefins.

The $C_3$-$C_4$ fraction 515 including $C_3$ and $C_3$ hydrocarbons that are at least partially derived from polymeric waste can then be passed into a $C_3$/$C_4$ separation stage 527 for separation into a $C_3$ fraction 525 and a $C_4$ fraction 527. The $C_3$ fraction 525 includes coker propane and coker propylene at least partially derived from polymer waste, including circular propane and circular propylene. The $C_4$ fraction 527 includes coker butane and coker butylene at least partially derived from coker waste, including circular butane and circular butylene. The $C_3$/$C_4$ separation stage 524 generally does not provide for 100% separation but should separate the propane and butane such that the $C_3$ fraction 525 includes primarily $C_3$ hydrocarbons, including propylene, including propane in an amount of at least 90%, at least 95%, at least 98%, or at least 99%. In some embodiments, the $C_3$/$C_4$ separation stage 527 may further include additional separation, such that $C_3$ fraction 525 is a $C_3$ olefin stream including propylene in an amount of at least 60 wt %, at least 80 wt %, at least 90 wt %, or at least 95 wt %. These separations can occur in one or more stages and in one or more vessels. Any suitable process may be used in the $C_3$/$C_4$ separation stage 524 including a $C_3$-$C_4$ splitter with a tower, reboiler, and condenser, among other equipment.

The $C_3$ fraction 525 from the $C_3$/$C_4$ separation stage 524 can then be passed to an oligomerization stage 528 for production of oligomerization products 532 from the coker propylene in the $C_3$ fraction 425. The oligomerization products 532 include, for example, oligomers of polypropylene, at least a portion of which are circular oligomers. Oligomerization stage 528 corresponds to any suitable oligomerization process for bonding two or more monomers, including cationic oligomerization over acid catalysts, such as solid phosphoric or acidic zeolite. The oligomerization processes may be in the solution, slurry, or gas-phase, among others. In some embodiments, the oligomerization products 532 include oligomers. At least a portion of the oligomerization products 532 produced in the oligomerization stage 528 include circular oligomers, among others. In the example shown in FIG. 5, all of the $C_3$ fraction 525 from the $C_3$/$C_4$ separation stage 524 is passed into the oligomerization stage 528. In other embodiments, a portion of the $C_3$ fraction 525 from the $C_3$/$C_4$ separation stage 524 is used for another purpose with another portion of the $C_3$ fraction 525 passed to the oligomerization stage 528.

The oligomerization products 532 from the oligomerization stage 528 can then be passed to a hydroformylation stage 530 for production of chemical products, such as aldehyde products 534, from the oligomers of propylene in the oligomerization products 532. The aldehyde products 534 include, for example, aldehydes, at least a portion of which are circular aldehydes. The aldehydes may be further processed, for example, to produce alcohols, plasticizers, solvents, dyes, and other chemical products, at least a portion of which are considered to be circular. Specific products include, for example, specialty fluids and chemical intermediates, such as $C_6$-$C_{16}$ olefins (e.g., hexene, octene), oxo-alcohols, isopropyl alcohols, and plastomers (e.g., ethylene-propylene-based polymers). Hydroformylation stage 530 corresponds to any suitable hydroformylation process for production of aldehydes from oligomers or propylene, including reaction of the oligomers with carbon monoxide and hydrogen. In the example shown in FIG. 5, all of the oligomerization products 532 from the oligomerization stage 528 is passed into the hydroformylation stage 530. In other embodiments, a portion of the oligomerization products 532 from the hydroformylation stage 530 is used for another purpose with another portion of the oligomerization products 532 passed to the oligomerization stage 528.

Coker Feed

In accordance with present embodiments, coking can be used to process a waste feedstock to produce coking products. In some embodiments, the waste feedstock is co-processed with a conventional coking feedstock.

The waste feedstock for coking can include or consist essentially of one or more types of polymers, such as polymers corresponding to plastic waste. The systems and methods described herein can be suitable for processing polymeric waste corresponding to a single type of polymer and/or polymeric waste corresponding to a plurality of polymers. In aspects where the waste feedstock consists essentially of polymers, the feedstock can include one or more types of polymers as well as any additives, modifiers, packaging dyes, and/or other components typically added to a polymer during and/or after formulation. The waste feedstock can further include components (e.g., paper) typically found in polymeric waste.

In some embodiments, the waste feedstock includes polymeric waste obtained from any source including, but not limited to, municipal, industrial, commercial or consumer sources. In some embodiments, the waste feedstock includes post-consumer use plastics. The polymeric waste further may include plastics obtained from a common source or from mixed sources, including mixed plastic waste obtained from municipal or regional sources and/or from waste streams of PET, HDPE, LDPE, LLDPE, polypropylene, and/or polystyrene. Furthermore, the waste feedstock may include thermoplastic elastomers and thermoset rubbers, such as from tires and other articles made from natural rubber, polybutadiene, styrene-butadiene, butyl rubber and EPDM.

Even further, examples of suitable waste feedstocks may include any of various used polymeric articles without limitation. Some examples of the many types of polymeric articles may include: films (including cast, blown, and otherwise), sheets, fibers, woven and nonwoven fabrics, furniture (e.g., garden furniture), sporting equipment, bottles, food and/or liquid storage containers, transparent and semi-transparent articles, toys, tubing and pipes, sheets, packaging, bags, sacks, coatings, caps, closures, crates, pallets, cups, non-food containers, pails, insulation, and/or medical devices. Further examples include industrial waste streams, such as linear alpha olefins and polypropylene heavy streams (e.g., >50 wt %). Further examples include automotive, aviation, boat and/or watercraft components (e.g., bumpers, grills, trim parts, dashboards, instrument panels and the like), wire and cable jacketing, agricultural films, geomembranes, playground equipment, and other such articles, whether blow molded, roto-molded, injection-molded, or the like. Any of the foregoing may include mixtures of polymeric and non-polymeric items (e.g., packaging or other articles may include inks, paperboards, papers, metal deposition layers, and the like). The ordinarily skilled artisan will appreciate that such polymeric articles may be made from any of various polymer and/or non-polymer materials, and that the polymer materials may vary widely (e.g., ethylene-based, propylene-based, butyl-based polymers, and/or polymers based on any $C_2$ to $C_{40}$ or even $C_6$-$C_{16}$ olefins, and further including polymers based on any one or more types of monomers, e.g., $C_2$ to $C_{40}$ α-olefin, di-olefin, cyclic olefin, etc. monomers). Common examples include ethylene, propylene, butylene, pentene, hexene, heptene, octene, and styrene; as well as multi-olefinic (including cyclic olefin) monomers such as ethylidene norbornene (ENB) and vinylidene norbornene (VNB) (including, e.g., when such cyclic olefins are used as comonomers, e.g., with ethylene monomers).

In various embodiments, the waste feedstock can include one or more nitrogen-containing polymers. Examples of nitrogen-containing polymers include polyamides (such as Nylon 6), polyurethanes, and polynitriles. The nitrogen-containing polymers can correspond to 0.1 wt % to 25 wt % of the waste feedstock (relative to the weight of the waste feedstock), or 1.0 wt % to 25 wt %, or 5.0 wt % to 25 wt %, or 10 wt % to 25 wt %, or 1.0 wt % to 15 wt %, or 5.0 wt % to 15 wt %, or 1.0 wt % to 10 wt %. For example, nitrogen-containing polymers may be in the waste feedstock in an amount of 25 wt % or less, 10 wt % or less, 5 wt % or less, 1 wt % or less, or 0.1 wt % or less.

In some embodiments, the waste feedstock can include one or more chlorine-containing polymers. Examples of chlorine-containing polymers including PVC (polyvinyl chloride) and PVDC (polyvinylidene chloride). In some aspects, the chlorine-containing polymers can correspond to as 0.001 wt % to 15 wt % of the waste feedstock (relative to the weight of the waste feedstock), or 0.1 wt % to 15 wt %, or 1.0 wt % to 15 wt %, or 0.001 wt % to 10 wt %, or 0.1 wt % to 10 wt %, or 1.0 wt % to 10 wt %, or 0.001 wt % to 5.0 wt %, or 0.001 wt % to 1.0 wt %. For example, the chlorine-containing polymers may be in the waste feedstock in an amount of about 15 wt % or less, 10 wt % or less, 5 wt % or less, 1 wt % or less, or 0.1 wt % or less.

In some embodiments, the waste feedstock can include at least one of polyethylene and polypropylene. The polyethylene can correspond to any convenient type of polyethylene, such as high density or low-density versions of polyethylene. Similarly, any convenient type of polypropylene can be used. Additionally or alternately, the waste feedstock can include one or more of polystyrene, polyamide (e.g., nylon), polyethylene terephthalate, and ethylene vinyl acetate. Still other polyolefins can correspond to polymers (including co-polymers) of butadiene, isoprene, and isobutylene. In some embodiments, the polyethylene and polypropylene can be present in the mixture as a co-polymer of ethylene and propylene. More generally, the polyolefins can include co-polymers of various olefins, such as ethylene, propylene, butenes, hexenes, and/or any other olefins suitable for polymerization.

In this discussion, unless otherwise specified, weights of polymers in a feedstock correspond to weights relative to the total polymer content in the feedstock. Any additives and/or modifiers and/or other components included in a formulated polymer are included in this weight. However, the weight percentages described herein exclude any solvents or carriers that might optionally be used to facilitate transport of the polymer into the coker.

In some embodiments, the waste feedstock includes 0.01 wt % to 35 wt % of polystyrene, or 0.1 wt % to 35 wt %, or 1 wt % to 35 wt %, or 0.01 wt % to 20 wt %, or 0.1 wt % to 20 wt %, or 1 wt % to 20 wt %, or 10 wt % to 35 wt %, or 5 wt % to 20 wt %, or 0.01 wt % to 10 wt %, or 0.01 wt % to 1 wt %. In some embodiments, the waste feedstock can also include oxygen-containing polymers, such as polyterephthalates. It is noted that polyamides also contain oxygen as part of the polymer structure. In this discussion, a polymer that includes both oxygen and nitrogen as part of the repeat unit for forming the polymer is defined as a nitrogen-containing polymer for purposes of characterizing the waste feedstock.

In addition to polymers, a waste feedstock can include a variety of other components. Such other components can include additives, modifiers, packaging dyes, and/or other components typically added to a polymer during and/or after formulation. The waste feedstock can further include any components typically found in polymeric waste. Finally, the feedstock can further include a carrier fluid so that the waste feedstock to the cracking process corresponds to a solution or slurry of the polymeric waste.

In embodiments where the waste feedstock is introduced into the coking environment at least partially as solids, having a small particle size can facilitate transport of the solids and/or reduce the likelihood of incomplete conversion. In some embodiments, the waste feedstock includes polymeric waste having a median particle size to 0.01 mm to 50 mm, 0.01 to 25 mm, 0.01 to 10 mm, 1 mm to 50 mm, 1 mm to 25 mm, 1 mm to 10 mm, 5 mm, or 0.1 mm to 5 mm, or 0.01 mm to 3 mm, or 0.1 mm to 3 mm, or 0.01 mm to 3 mm, or 0.1 mm to 3 mm, or 1 mm to 5 mm, or 1 mm to 3 mm. For determining a median particle size, the particle size is defined as the diameter of the smallest bounding sphere that contains the particle. Additionally or alternately, the polymeric waste in the waste feedstock can be melted and/or pelletized to improve the uniformity of the particle size of the plastic particles. In some embodiments, the polymeric waste has a maximum particles size of 10 mm or less, or 5 mm or less. Additionally or alternately, the polymeric waste can be provided in waste bail. In some embodiments, the waste bale is a composite bale.

It is noted that some types of polymeric waste can also include bio-derived components. For example, some types of plastic labels can include biogenic waste in the form of paper compounds. In some embodiments, 1 wt % to 25 wt % of the waste feedstock can correspond to bio-derived material. Such bio-derived material can also potentially contribute to the nitrogen and/or oxygen content of a waste feedstock.

Optionally, a carrier fluid can also be included in the waste feedstock to assist with introducing the polymeric waste into the cracking environment. For introduction into a cracking environment, it can be convenient for the feedstock to be in the form of a slurry. If a carrier fluid is used for transporting the waste feedstock, any suitable fluid can be used. Examples of suitable carrier fluids can include (but are not limited to) a wide range of petroleum or petrochemical products. For example, some suitable carrier fluids include crude oil, naphtha, kerosene, diesel, light or heavy cycle oils, catalytic slurry oil, and gas-oils. Other potential carrier fluids can correspond to naphthenic and/or aromatics solvents, such as toluene, benzene, methylnaphthalene, cyclohexane, methylcyclohexane, and mineral oil. Still other carrier fluids can correspond to refinery fractions, such as a gas oil fraction or naphtha fraction from a coker. As yet another example, a distillate and/or gas oil boiling range fraction can be used that generated by cracking of the waste feedstock, either alone or with an additional feedstock.

In various embodiments, coking is used to co-process a combined feedstock corresponding to a mixture of a conventional coking feedstock and a waste feedstock. In some embodiments, the conventional coking feedstock is used as the carrier fluid for the waste feedstock. The conventional coking feedstock can correspond to one or more types of petroleum and/or renewable feeds with a suitable boiling range for cracking, such as processing in a coker. The amount of waste feedstock in the combined feedstock can correspond to 1 wt % to 50 wt %, 3 wt % to 50 wt %, 10 wt % to 50 wt %, 25 wt % to 50 wt %, 1 wt % to 25 wt %, 1 wt % to 10 wt %, 1 wt % to 5%, 1 wt % to 3 wt %, 3 wt % to 25 wt %, 10 wt % to 25 wt %, 3 wt % to 15 wt % by weight of the combined feedstock. The conventional coking feedstock can correspond to 50% to 99% by weight of the combined feedstock to the coker.

In some embodiments, the coking feedstock for co-processing with the waste feedstock can correspond to a conventional petroleum feedstock having a relatively high boiling fraction, such as a heavy oil feed. For example, the coking feedstock portion of the feed can have a T10 distillation point of 343° C. or more, or 371° C. or more. In some embodiments, the coking feedstock has a T10 distillation point of 343° C. to 650° C. Examples of suitable heavy oils for inclusion in the coking feedstock include reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt %, generally from 5 wt % to 50 wt %. In some embodiments, the coking feedstock includes a petroleum vacuum residuum.

Some examples of conventional petroleum feedstock suitable for processing in a delayed coker or fluidized bed coker can have a composition and properties within the ranges set forth below in Table 1.

TABLE 1

Example Coker Feedstock

| Conradson Carbon | 5 to 40 | wt % |
|---|---|---|
| API Gravity | −10 to 35° | |
| Boiling Point | 340° C.+ to 650° C.+ | |
| Sulfur | 1.5 to 8 | wt % |
| Hydrogen | 9 to 11 | wt % |
| Nitrogen | 0.2 to 2 | wt % |
| Carbon | 80 to 86 | wt % |
| Metals | 1 to 2000 | wppm |

In addition to petroleum feedstocks, renewable feedstocks derived from biomass having a suitable boiling range can also be used as part of the cracking feed. Such renewable feedstocks include feedstocks with a T10 boiling point of 340° C. or more and a T90 boiling point of 600° C. or less. An example of a suitable renewable feedstock derived from biomass can be a cracking oil feedstock derived at least in part from biomass.

In some particular embodiments, the waste feedstock and the conventional coking feedstock (e.g., coker feedstock) are mixed to form a combined feedstock prior to entering the coking environment. In other embodiments, the waste feedstock and the conventional coking feedstock are separately introduced into the coking environment. More generally, however, any convenient method for introducing both the waste feedstock and the coking feedstock into the coking environment can be used.

Prior to being introduced into the coking environment, the feedstocks (optionally in the form of a combined feedstock) are pre-heated in accordance with one or more embodiments. Pre-heating the feedstocks in one or more heating stages can increase the temperature of the feedstocks to a mixing and storage temperature, to a temperature related to the cracking temperature, or to another convenient temperature.

In some embodiments, a portion of the pre-heating of a waste feedstock can be performed by mixing the waste feedstock with a coking feedstock in a mixing tank and heating the mixture in the mixing tank. For example, a waste feedstock and a coking feedstock can be mixed in a heated stirred tank for storage operating at 200° C. to 325° C., or 275° C. to 325° C. In some embodiments, tank agitation aids in uniform dispersal of the waste feedstock into resid and maintains slurry suspension. Heating in a mixing tank provides heat to the combined feedstock prior to introducing the combined feedstock into the cracking reaction environment. This can reduce or minimize additional cracking heat duty that would otherwise be required to heat the waste feedstock to thermal cracking temperatures. The mixed feedstock may be further heated and/or physically processed for particle size reduction prior to injection into the cracking reactor. The combined feedstock may be sized to provide particles with a maximum particle size, for example, of 5 mm or less, 2 mm or less, or 1 mm or less. In some embodiments, the particles are sized with milling equipment, such as a roller mill. In addition to heating, stripping of the combined waste feedstock and coking feedstock using a stripping gas can be performed in a mixing tank. Passing a stripping gas through the combined feedstock can assist with removing gases that are entrained in the combined feedstock.

In some embodiments, the waste feedstock is melted, for example, in an extruder. After extruding, the waste feedstock including melted polymeric waste can either be directly mixed with a conventional coking feedstock and/or a solvent, or the extruded plastic can be pelletized to form a desired particle size for the waste feedstock.

Still another option can be to mix the waste feedstock with the coking feedstock after the pre-heater furnace for the coker, in accordance with certain embodiments. In these embodiments, the coking feedstock can be heated to a higher temperature in the pre-heater, and then the waste feedstock can be added to the pre-heated coking feedstock to heat the waste feedstock.

Pyrolysis

In accordance with one or more embodiments, the waste feedstock is pyrolyzed to generate a pyrolysis oil that is then fed to the coking environment. In some embodiments, the waste feedstock is pyrolyzed with one or more additional feedstocks, such as rubber-containing feedstocks. In some embodiments, the pyrolysis oil at least partially derived from polymeric waste is co-processed in the coking environment with a conventional coking feedstock.

Pyrolysis is a technique of chemical recycling that includes thermal degradation of the pyrolysis feedstock to produce gas and liquid products, referred to as pyrolysis oil and a pyrolysis gas. Waste plastic pyrolysis units are distinct from coker units that have been specially designed to handle heavier feeds. In some embodiments, the waste feedstock may be heated in an environment free (or substantially free) of oxygen. For example, the pyrolysis may occur in an environment that includes about 5 weight percent oxygen or less, about 3 weight percent oxygen or less, about 1 weight percent oxygen or less, or about 0.5 weight percent oxygen or less. The pyrolysis products may depend on a number of factors, including, but not limited to, pyrolysis reactor temperature, pyrolysis reactor pressure, reactor residence time, feed type, feed quality, and process configuration.

A specific pyrolysis technique will now be described in more detail. In an example embodiment, a pyrolysis feedstock (e.g., a waste feedstock) may be provided, for example, in a granular, flake, or pellet form, and fed to a pyrolysis unit. In the pyrolysis unit, the waste feedstock may be melted to produce a molten liquid (e.g., molten plastic). For example, the polymeric waste may be melted in an extruder to a temperature of about 300° C. to about 320° C. The molten liquid may then be pyrolyzed in an environment free (or substantially free) of oxygen to produce pyrolysis gases. For example, the molten liquid may be heated in pyrolysis chamber to a higher temperature, such as 390° C. to about 550° C., while agitating. Long chain hydrocarbons (e.g., approximately 30 carbon atoms or longer) in the produced pyrolysis gases may then be condensed and further pyrolyzed for further thermal degradation while shorter chain hydrocarbons may exit in gaseous form. For example, the produced pyrolysis gases may be directed to a contactor for contact with a bank of condenser elements (e.g., plates) upon which the long chain hydrocarbons may condense. The long chain hydrocarbons may flow from the condenser back to the pyrolysis chamber. The pyrolysis gases including the shorter chain hydrocarbons may be distilled in a distillation column to provide pyrolysis gas and pyrolysis oil.

Figure 6:
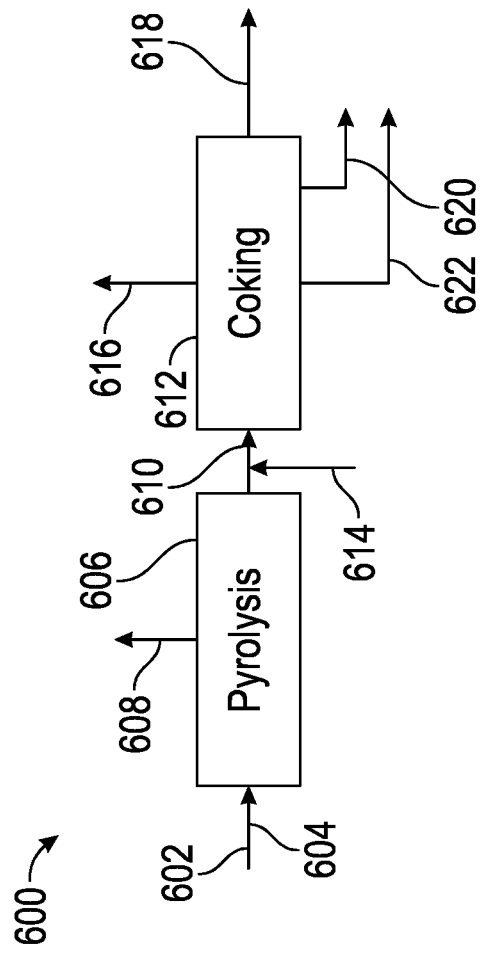
FIG. 6 is an illustrate depiction of a process for pyrolysis of polymeric waste followed by coking.

FIG. 6 illustrates an example configuration for pyrolyzing a waste feedstock followed by coking. In the pyrolysis process 600 of FIG. 6, a waste feedstock 602 and one or more optional feedstocks 604 are fed into the pyrolysis unit 606. The waste feedstock 602 includes polymeric waste, such as plastic waste. In the pyrolysis unit 606, the waste feedstock 602 containing the polymeric waste may be pyrolyzed to form at least a pyrolysis gas 608 and a pyrolysis oil 610. The pyrolysis unit 606 can include a variety of different equipment suitable for pyrolysis of polymeric waste, including but not limited to, reactors, extruders, tanks, vessels, valves, sensors, hoppers, conveyance systems, and piping, among others.

The pyrolysis oil 610 that is at least partially derived from polymeric waste is then passed into coking stage 612. Coking stage 612 corresponds to any suitable coking for coking the pyrolysis oil, including a delayed coker, a fluidized coker, or a combination thereof. As illustrated, a conventional coking feedstock 614 can also be fed into the coking stage 612 in accordance with one or more embodiments. In the coking stage 612, the combined feedstock of the pyrolysis oil 610 and the conventional coking feedstock 614 are processed to form at least a coking effluent. In the example shown in FIG. 6, the coking effluent can be separated to form a coker gas fraction 616, a coker naphtha fraction 618, and a coker gas oil fraction 620. A coke product 622 is also shown, but it should be understood that the coke product 622 is typically withdrawn from a coker separately from the coker effluent and gasified in a Flexicoker, for example.

Coking

In accordance with one or more embodiments, the waste feedstock is coked, either alone or with a conventional coking feedstock, to produce more valuable coking products. In various aspects, co-processing can be performed by exposing the combined feedstock of waste feedstock and conventional coking feedstock to coking conditions.

Coking is a refining process that includes thermal cracking of longer chain molecules into shorter chain molecules with excess carbon left behind in the form of coke, Coking processes in modern refinery settings can typically be categorized as delayed coking or fluidized bed coking. In both processes, the feedstock is cracked to produce gas and liquid products, leaving behind coke. In delayed coking, the feedstock is heated and fed to a coking reactor (commonly referred to as a "coke drum") where the cracking takes place. To remove the coke, alternating drums can be used. In fluidized coking, the feedstock is head to the coking reactor Where cracking takes place with coke transferred from the coking reactor to a heater as a fluidized solid.

The coking products produced from coking include a cracking effluent, which may include a gas, a liquid, or a mixture thereof. The cracking effluent can be fractionated or otherwise separated to form desirable product streams, such as coker gas (e.g., $C_4$ and lighter hydrocarbons), coker naphtha, and coker gas oil.

Coker naphtha is a liquid coker effluent fraction that is formed in the coker with a T10 distillation point of 30° C. or higher and a T90 distillation point of 220° C. or less. Coker naphtha is a mixture of many different hydrocarbons, including paraffins, napthenes, olefins, and aromatics. Coker naphthas can include hydrocarbons ranging from 4 carbon atoms to 12 carbon atoms.

Coker gas oil is a coker effluent fraction that is formed in the coker with a T10 distillation point of 225° C. or higher and a T90 distillation point of 650° C. or less. Coker gas oil is a mixture of many different hydrocarbons, including paraffins, olefins, and aromatics. Coker gas oil can include hydrocarbons ranging from 8 carbon atoms to 70 carbon atoms.

Coker gas is a coker effluent fraction that is formed in the coker with a T90 distillation point of 40° C. or less. Coker gas is a mixture of many different hydrocarbons, including paraffins, olefins, and aromatics. Coker gas can include hydrocarbons ranging from 1 carbon atom to 5 carbon atoms. Coker gas can additionally include trace amounts of higher hydrocarbons (e.g., $C_6$), including benzene in gas. While coker gas is referred to a gas, it should be understood that the coker gas can be in liquid form, for example, depending on temperature and pressure, so long as the coker gas has a final boiling point of 100° C. or less.

The coker gas at least partially derived from polymeric waste can have desirable reductions in certain components as compared to from a conventional hydrocarbon feedstock, such as decreases in sulfur and paraffin content. For example, the sulfur content of coker gas derived from a conventional hydrocarbon feedstock can range from roughly 0.5 wt % to 5 wt % while coker gas that is at least partially derived from polymeric waste can have a lower sulfur content, for example, about 0.1 wt % to 1.8 wt % or from 0.1 wt % to 1 wt % or from 0.4 wt % to 1.8 wt %. In some embodiments, the coker gas include carbonyl sulfide, for example, in an amount of 1 wppm to 25 wppm or 1 wppm to 10 wppm. By way of further example, the coker gas that is at least partially derived from polymeric waste can have a paraffin content of 70 wt % to 80 wt %. In addition, the coker gas can have desirable increases of other components, such as olefins. In some embodiments, the coker gas can include olefins in an amount of 10 wt % to 30 wt % or 15 wt % to 20 wt %.

In addition to a desirable decrease in aromatics and sulfur, the coker gas that is at least partially derived from polymeric waste can have increased levels of other components that can complicate subsequent chemical processing. Such components include halides, oxygen, and basic nitrogen, for example. The specific type and amount of these components depends, for example, on the particular polymeric waste used in forming the coker gas. For example, the coker gas at least partially derived from polymeric waste can include halides, such as chlorine, fluorine, and bromine, in amounts. For example, the coker gas can have a total halide content for example, of 1 wppm to 1000 wppm, or 1 wppm to 500 wppm, or 10 wppm to 150 wppm, or 10 wppm to 100 wppm while coker gas derived from a conventional hydrocarbon feedstock can include halides at levels below 30 wppm. In some embodiments, the coker gas includes fluorides, such as hydrogen fluoride, methyl fluoride, and vinylidene fluoride, among others. The fluoride(s) can be present at any level depending, for example, on the particular polymeric waste processed, including 1 wppm to 100 wppm, or 1 wppm to 50 wppm, or 1 wppm to 25 wppm. In some embodiments, the coker gas includes chlorides, such as hydrogen chloride, methyl chloride, ethyl chloride, and vinyl chloride, among others. The chloride(s) can be present at any level depending, for example, on the particular polymeric waste processed, including 1 wppm to 150 wppm, or 1 wppm to 150 wppm, or 10 wppm to 150 wppm, or 10 wppm to 100 wppm. Hydrogen chloride may be present, for example, in an amount of 1 wppm to 150 wppm, or 1 wppm to 150 wppm, or 10 wppm to 150 wppm, or 10 wppm to 100 wppm. Organic chlorides may be present, for example, in an amount of 0.1 wppm to 5 wppm or 0.1 to 1 wppm. In some embodiments, the coker gas includes bromides, such as hydrogen bromide and methyl bromide, among others. The bromide(s) can be present at any level depending, for example, on the particular polymeric waste processed, including 1 wppm to 1000 wppm, 1 wppm to 500 wppm, 1 wppm to 150 wppm, or 1 wppm to 150 wppm, or 10 wppm to 150 wppm, or 10 wppm to 100 wppm.

In some embodiments, the coker gas at least partially derived from polymeric waste can include nitrogen-containing compounds, such as ammonia, hydrogen cyanide, and acetonitrile. The nitrogen-containing compounds can be present at any level, depending for example, on the particular polymeric waste that was process, including a concentration of 250 wppm to 5,000 wppm or 300 wppm to 750 wppm.

In some embodiments, the coker gas at least partially derived from polymeric waste can include oxygen-containing compounds, such as carbon monoxide, carbon dioxide, acetaldehyde, acetone, acrolein, and methanol. The oxygen-containing compounds can be present at any level, depending for example, on the particular polymeric waste that was process, including a concentration of 1 wppm to 15 wt % or 1 wppm to 10 wt % or 1 wppm to 5 wt %.

Some examples of a coker gas that may be produced in a coker can have a composition (after separation of coker naphtha) within the ranges set forth below in Table 2. The exact composition will depend on a number of variables, including feed selection, operation conditions and separations processes, among others. This also does not represent all components that may be present in coker gas, but only some of the primary components.

TABLE 2

| Example Coker Gas | |
|---|---|
| Hydrogen (wt %) | 0.2-0.4% |
| Methane (wt %) | 20-30% |
| Ethane (wt %) | 10-25% |
| Ethylene (wt %) | 3-7% |
| Propane (wt %) | 10-25% |
| Propylenes (wt %) | 5-15% |
| Butane (wt %) | 5-15% |
| Butylenes (wt %) | 5-15% |

As indicated, the coker gas has some olefin content but is much lower in olefins than other refinery streams, such as FCC gas. The increased olefin content increases the desirability to recover the olefins versus using it as fuel for other refinery needs.

The coking products further include coke. Because many polymeric wastes have relatively low sulfur content (as compared to a conventional coking feedstock), the cracking products have reduced sulfur content, in some embodiments, thus reducing the needed severity for any subsequent sulfur removal processes, such as hydroprocessing. Coke produced in a coking process is typically a carbonaceous solid material of which a majority is carbon. Since the coke is produced from the co-processing of a conventional coking feedstock in the coker, it can also be referred to as petroleum coke or petcoke, in accordance with one or more embodiments. The coke yield typically is 20 wt % to 40 wt % of the combined coker feedstock. However, since polymeric wastes can have substantially higher atomic ratio of hydrogen to carbon, coking with a waste feedstock can produce a reduced or minimized amount of coke. The particular composition of the coke depends on a number of factors, including the particular coking process, such as a delayed coker or fluidized coker. Additional components in the coke include hydrogen, nitrogen, sulfur, and heavy metals, such as aluminum, boron, calcium, chromium cobalt, iron, manganese, magnesium, molybdenum, nickel, potassium, phosphorous, silicon, sodium, titanium, and/or vanadium. In some embodiments, the coke can include phosphorous in amount of 0 wppm to 1,000 wppm, 10 wppm to 1,000 wppm, or 100 wppm to 300 wppm.

Coking Conditions—Fluidized Coking

In accordance with one or more embodiments, polymeric waste can be processed in a fluidized coker. In some embodiments, the plastic waste is co-processed with a conventional coking feedstock. In various aspects, co-processing can be performed by exposing the combined feedstock of waste feedstock and conventional coking feedstock to fluidized coking conditions.

Fluidized coking is a petroleum refining process in which heavy petroleum feeds, typically the non-distillable residues (resids) from the fractionation of heavy oils are converted to lighter, more useful products by thermal decomposition (coking) at elevated reaction temperatures, typically 480° C. to 590° C., and in most cases from 500° C. to 550° C. Example heavy oils suitable for processing by the fluidized coking process include heavy atmospheric resids, petroleum vacuum distillation bottoms, aromatic extracts, asphalts, and bitumens from tar sands, tar pits and pitch lakes. In accordance with present embodiments, the plastic waste is processed in the fluidized coker either alone or in combination with a conventional coker feedstock.

Fluidized coking is carried out in a unit with a large reactor containing hot coke particles which are maintained in the fluidized condition at the required reaction temperature with steam injected at the bottom of the vessel with the average direction of movement of the coke particles being downwards through the bed. In particular embodiments, the combined feedstock is heated to a pumpable temperature, typically in the range of 350° C. to 400° C., mixed with atomizing steam, and fed through multiple feed nozzles arranged at several successive levels in the reactor. Steam is injected into a stripping section at the bottom of the reactor and passes upwards through the coke particles descending through the dense phase of the fluid bed in the main part of the reactor above the stripping section. Part of the feed liquid coats the coke particles in the fluidized bed and is subsequently cracked into layers of solid coke and lighter products which evolve as gas or vaporized liquid. The residence time of the feed in the coking zone (where temperatures are suitable for thermal cracking) is on the order of 1 second to 30 seconds. Reactor pressure is relatively low in order to favor vaporization of the hydrocarbon vapors which pass upwards from dense phase into dilute phase of the fluid bed in the coking zone and into cyclones at the top of the coking zone where most of the entrained solids are separated from the gas phase by centrifugal force in one or more cyclones and returned to the dense fluidized bed by gravity through the cyclone diplegs. The mixture of steam and hydrocarbon vapors from the reactor is subsequently discharged from the cyclone gas outlets into a scrubber section in a plenum located above the coking zone and separated from it by a partition. It is quenched in the scrubber section by contact with liquid descending over sheds. A pump-around loop circulates condensed liquid to an external cooler and back to the top shed row of the scrubber section to provide cooling for the quench and condensation of the heaviest fraction of the liquid product. This heavy fraction is typically recycled to extinction by feeding back to the coking zone in the reactor.

During a fluidized coking process, the coking feedstock, pre-heated to a temperature at which it is flowable and pumpable, is introduced into the coking reactor towards the top of the reactor vessel through injection nozzles which are constructed to produce a spray of the feed into the bed of fluidized coke particles in the vessel. Temperatures in the coking zone of the reactor are typically in the range of 450° C. to 650° C. and pressures are kept at a relatively low level, typically in the range of 0 kPag to 700 kPag, and most usually from 35 kPag to 320 kPag, in order to facilitate fast drying of the coke particles, preventing the formation of sticky, adherent high molecular weight hydrocarbon deposits on the particles which could lead to reactor fouling. In some embodiments, the temperature in the coking zone can be 450° C. to 600° C., or 450° C. to 550° C. The conditions can be selected so that a desired amount of conversion of the feedstock occurs in the fluidized bed reactor. For example, the conditions can be selected to achieve at least 10 wt % conversion relative to 343° C. (or 371° C.), or at least 20 wt % conversion relative 343° C. (or 371° C.), or at least 40 wt % conversion relative to 343° C. (or 371° C.), such as up to 80 wt % conversion or possibly still higher. The light hydrocarbon products of the coking (thermal cracking) reactions vaporize, mix with the fluidizing steam and pass upwardly through the dense phase of the fluidized bed into a dilute phase zone above the dense fluidized bed of coke particles. This mixture of vaporized hydrocarbon products formed in the coking reactions flows upwardly through the dilute phase with the steam at superficial velocities of roughly 1 to 2 meters per second (~3 to 6 feet per second), entraining some fine solid particles of coke which are separated from the cracking vapors in the reactor cyclones as described above. In embodiments where steam is used as the fluidizing agent, the weight of steam introduced into the reactor can be selected relative to the weight of feedstock introduced into the reactor. For example, the mass flow rate of steam into the reactor can correspond to 6.0% of the mass flow rate of feedstock, or 8.0% or more, such as up to 10% or possibly still higher. The amount of steam can potentially be reduced if an activated light hydrocarbon stream is used as part of the stripping and/or fluidizing gas in the reactor. In such embodiments, the mass flow rate of steam can correspond to 6.0% of the mass flow rate of feedstock or less, or 5.0% or less, or 4.0% or less, or 3.0% or less. Optionally, in some embodiments, the mass flow rate of steam can be still lower, such as corresponding to 1.0% of the mass flow rate of feedstock or less, or 0.8% or less, or 0.6% or less, such as down to substantially all of the steam being replaced by the activated light hydrocarbon stream. The cracked hydrocarbon vapors pass out of the cyclones into the scrubbing section of the reactor and then to product fractionation and recovery.

In a general fluidized coking process, the coke particles formed in the coking zone pass downwards in the reactor and leave the bottom of the reactor vessel through a stripper section where they are exposed to steam in order to remove occluded hydrocarbons. The solid coke from the reactor, consisting mainly of carbon with lesser amounts of hydrogen, sulfur, nitrogen, and traces of vanadium, nickel, iron, and other elements derived from the feed, passes through the stripper and out of the reactor vessel to a burner or heater where it is partly burned in a fluidized bed with air to raise its temperature from 480° C. to 700° C. to supply the heat required for the endothermic coking reactions, after which a portion of the hot coke particles is recirculated to the fluidized bed reaction zone to transfer the heat to the reactor and to act as nuclei for the coke formation. The balance is withdrawn as coke product. The net coke yield is only 65 percent of that produced by delayed coking.

For a coking process that includes a gasification zone, the cracking process proceeds in the reactor, the coke particles pass downwardly through the coking zone, through the stripping zone, where occluded hydrocarbons are stripped off by the ascending current of fluidizing gas (steam). They then exit the coking reactor and pass to the gasification reactor (gasifier) which contains a fluidized bed of solid particles and which operates at a temperature higher than that of the reactor coking zone. In the gasifier, the coke particles are converted by reaction at the elevated temperature with steam and an oxygen-containing gas into a fuel gas including carbon monoxide and hydrogen.

The gasification zone is typically maintained at a high temperature ranging from 850° C. to 1,000° C. and a pressure ranging from 0 kPag to 1000 kPag, preferably from 200 kPag to 400 kPag. Steam and an oxygen-containing gas are introduced to provide fluidization and an oxygen source for gasification. In some embodiments, the oxygen-containing gas can be air. In other embodiments, the oxygen-containing gas can have a low nitrogen content, such as oxygen from an air separation unit or another oxygen stream including 95 vol % or more of oxygen, or 98 vol % or more, are passed into the gasifier for reaction with the solid particles including coke deposited on them in the coking zone. In embodiments where the oxygen-containing gas has a low nitrogen content, a separate diluent stream, such as a recycled $CO_2$ or $H_2S$ stream derived from the fuel gas produced by the gasifier, can also be passed into the gasifier.

In the gasification zone the reaction between the coke and the steam and the oxygen-containing gas produces a hydrogen and carbon monoxide-containing fuel gas and a partially gasified residual coke product. Conditions in the gasifier are selected accordingly to generate these products. Steam and oxygen rates (as well as any optional $CO_2$ rates) will depend upon the rate at which cold coke enters from the reactor and to a lesser extent upon the composition of the coke which, in turn will vary according to the composition of the heavy oil feed and the severity of the cracking conditions in the reactor with these being selected according to the feed and the range of liquid products which is required. In some embodiments, the fuel gas product from the gasifier contains entrained coke solids and these are removed by cyclones or other separation techniques in the gasifier section of the unit. Suitable cyclones include internal cyclones in the main gasifier vessel itself or external in a separate, smaller vessel as described below. The fuel gas product is taken out as overhead from the gasifier cyclones. The resulting partly gasified solids are removed from the gasifier and introduced directly into the coking zone of the coking reactor at a level in the dilute phase above the lower dense phase.

In some embodiments, the coking conditions can be selected to provide a desired amount of conversion relative to 343° C. Typically a desired amount of conversion can correspond to 10 wt % or more, or 50 wt % or more, or 80 wt % or more, such as up to substantially complete conversion of the feedstock relative to 343° C.

The volatile products from the coke drum are conducted away from the process for further processing. For example, volatiles can be conducted to a coker fractionator for distillation and recovery of coker gases, coker naphtha, light gas oil, and heavy gas oil. Such fractions can be used, usually, but not always, following upgrading, in the blending of fuel and lubricating oil products such as motor gasoline, motor diesel oil, fuel oil, and lubricating oil. Upgrading can include separations, heteroatom removal via hydrotreating and non-hydrotreating processes, de-aromatization, solvent extraction, and the like. The process is compatible with processes where at least a portion of the heavy coker gas oil present in the product stream introduced into the coker fractionator is captured for recycle and combined with the fresh feed (coker feed component), thereby forming the coker heater or coker furnace charge. The combined feedstock ratio ("CFR") is the volumetric ratio of furnace charge (fresh feed plus recycle oil) to fresh feed to the continuous fluidized coker operation. Fluidized coking operations typically employ recycles of 5 vol % to 35 vol % (CFRs of 1.05 to 1.35). In some embodiments, there can be no recycle and sometimes in special applications recycle can be up to 200%.

The Flexicoking™ process, developed by Exxon Research and Engineering Company, is a type of fluidized coking process that is operated in a unit including a reactor and a heater, but also including a gasifier for gasifying the coke product by reaction with an air/steam mixture to form a low heating value fuel gas. A stream of coke passes from the heater to the gasifier where all but a small fraction of the coke is gasified to a low-BTU gas (~120 BTU/standard cubic feet) by the addition of steam and air in a fluidized bed in an oxygen-deficient environment to form fuel gas including carbon monoxide and hydrogen. In a conventional Flexicoking™ configuration, the fuel gas product from the gasifier, containing entrained coke particles, is returned to the heater to provide most of the heat required for thermal cracking in the reactor with the balance of the reactor heat requirement supplied by combustion in the heater. A small amount of net coke (1 percent of feed) is withdrawn from the heater to purge the system of metals and ash. The liquid yield and properties are comparable to those from fluidized coking. The fuel gas product is withdrawn from the heater following separation in internal cyclones which return coke particles through their diplegs.

In this description, the term "Flexicoking" (trademark of ExxonMobil Research and Engineering Company) is used to designate a fluidized coking process in which heavy petroleum feeds are subjected to thermal cracking in a fluidized bed of heated solid particles to produce hydrocarbons of lower molecular weight and boiling point along with coke as a by-product which is deposited on the solid particles in the fluidized bed. References to fluidized cokers are intended to include conventional fluidized cokers as well as flexicokers. The resulting coke can then be converted to a fuel gas by contact at elevated temperature with steam and an oxygen-containing gas in a gasification reactor (gasifier). This type of configuration can more generally be referred to as an integration of fluidized bed coking with gasification. FIGS. 3 and 4 provide examples of fluidized coking reactors that include a gasifier.

Figure 7:
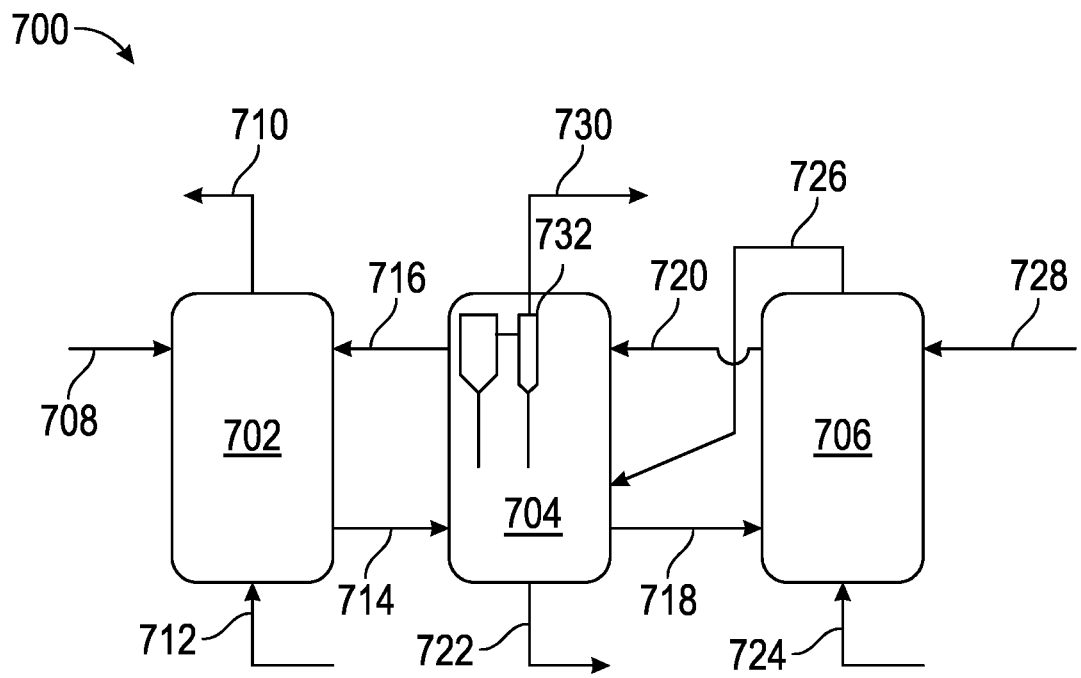
FIG. 7 is an illustrative depiction of a fluidized bed coking system including a coker, a heater, and a gasifier in accordance with certain embodiments of the present disclosure.

FIG. 7 shows an example of a Flexicoker unit (i.e., a system including a gasifier that is thermally integrated with a fluidized bed coker) with three reaction vessels: reactor, heater and gasifier. The coking system 700 includes coker reactor 702 with the coking zone and its associated stripping and scrubbing sections (not separately indicated), heater 704 and gasifier 706. A coking feedstock, which may be a waste feedstock (or combined feedstock of waste feedstock and conventional coking feedstock) is introduced into the coking system 700 by line 708 and coker effluent withdrawn through line 710. While FIG. 7, shows a combined feedstock, example embodiments also include separate introduction of the conventional coking feedstock and waste feedstock to the coker reactor 702. Fluidizing and stripping steam is supplied by line 712. Cold coke is taken out from the stripping section at the base of coker reactor 702 by means of line 714 and passed to heater 704. The term "cold" as applied to the temperature of the withdrawn coke is, of course, decidedly relative since it is well above ambient at the operating temperature of the stripping section. Hot coke is circulated from heater 704 to coker reactor 702 through line 716. Coke from heater 704 is transferred to gasifier 706 through line 718 and hot, partly gasified particles of coke are circulated from the gasifier back to the heater 704 through line 720. The excess coke is withdrawn from the heater 704 by way of line 722. In conventional configurations, gasifier 706 is provided with its supply of steam and air by line 724 and hot fuel gas is taken from the gasifier to the heater though line 726. In some alternative embodiments, instead of supplying air via a line 724 to the gasifier 706, a stream of oxygen with 95 vol % purity or more can be provided, such as an oxygen stream from an air separation unit. In such embodiments, in addition to supplying a stream of oxygen, a stream of an additional diluent gas can be supplied by line 728. The additional diluent gas can correspond to, for example, $CO_2$ separated from the fuel gas generated during the gasification. The fuel gas is taken out from the unit through line 730 on the heater; coke fines are removed from the fuel gas in heater cyclone system 732 including serially connected primary and secondary cyclones with diplegs which return the separated fines to the fluid bed in the heater. The fuel gas from line 730 can then undergo further processing. For example, in some embodiments, the fuel gas from line 730 can be passed into a separation stage for separation of $CO_2$ (and/or $H_2S$). This can result in a stream with an increased concentration of synthesis gas, which can then be passed into a conversion stage for conversion of synthesis gas to methanol.

It is noted that in some optional embodiments, heater cyclone system 732 can be located in a separate vessel (not shown) rather than in heater 704. In such aspects, line 730 can withdraw the fuel gas from the separate vessel, and the line 722 for purging excess coke can correspond to a line transporting coke fines away from the separate vessel. These coke fines and/or other partially gasified coke particles that are vented from the heater (or the gasifier) can have an increased content of metals relative to the feedstock. For example, the weight percentage of metals in the coke particles vented from the system (relative to the weight of the vented particles) can be greater than the weight percent of metals in the feedstock (relative to the weight of the feedstock). In other words, the metals from the feedstock are concentrated in the vented coke particles. Since the gasifier conditions do not create slag, the vented coke particles correspond to the mechanism for removal of metals from the coker/gasifier environment. In some embodiments, the metals can correspond to a combination of nickel, vanadium, and/or iron. Additionally, or alternately, the gasifier conditions can cause substantially no deposition of metal oxides on the interior walls of the gasifier, such as deposition of less than 0.1% by weight of the metals present in the feedstock introduced into the coker/gasifier system, or less than 0.01% by weight.

In configurations such as FIG. 7, the system elements shown in the figure can be characterized based on fluid communication between the elements. For example, coker reactor 702 is in direct fluid communication with heater 704. Coker reactor 702 is also in indirect fluid communication with gasifier 706 via heater 704.

As an alternative, integration of a fluidized bed coker with a gasifier can also be accomplished without the use of an intermediate heater. In such alternative aspects, the cold coke from the reactor can be transferred directly to the gasifier. This transfer, in almost all cases, will be unequivocally direct with one end of the tubular transfer line connected to the coke outlet of the reactor and its other end connected to the coke inlet of the gasifier with no intervening reaction vessel, i.e., heater. The presence of devices other than the heater is not however to be excluded, e.g., inlets for lift gas etc. Similarly, while the hot, partly gasified coke particles from the gasifier are returned directly from the gasifier to the reactor this signifies only that there is to be no intervening heater as in the conventional three-vessel Flexi-coker™ but that other devices may be present between the gasifier and the reactor, e.g., gas lift inlets and outlets.

Figure 8:
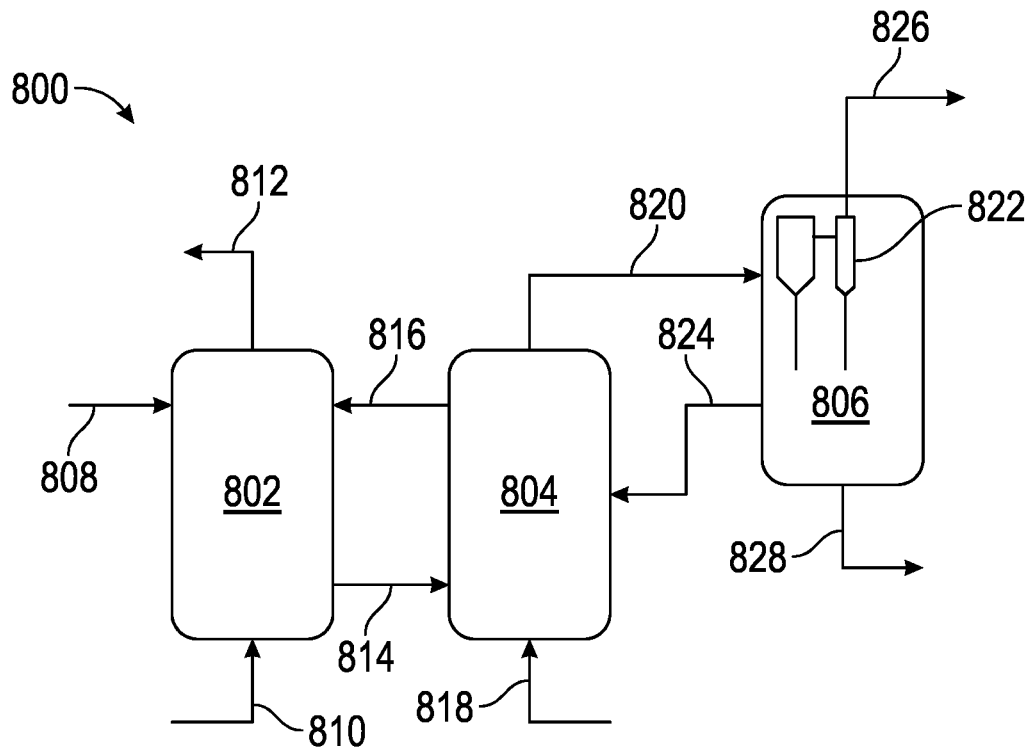
FIG. 8 is an illustrative depiction of a fluidized bed coking system including a coker and a gasifier in accordance with certain embodiments of the present disclosure.

FIG. 8 shows an example of integration of a fluidized bed coker with a gasifier but without a separate heater vessel. In the configuration shown in FIG. 8, the cyclones for separating fuel gas from catalyst fines are located in a separate vessel. In other aspects, the cyclones can be included in a main gasifier vessel 804.

In the configuration shown in FIG. 8, the coker system 800 includes a coker reactor 802, main gasifier vessel 804 and a separator vessel 806. The coking feedstock is introduced into coker reactor 802 through line 808 and fluidizing/stripping gas through line 810; coker effluent is taken out through line 812. The coking feedstocks includes a waste feedstock with optional combination with a conventional coking feedstock (e.g., heavy oil feed). The waste feedstock can be separately introduced to the coker reactor 802 or introduced in combination with a conventional coking feedstock, for example. Cold, stripped coke is routed directly from coker reactor 802 to main gasifier vessel 804 by way of line 814 and hot coke returned to the reactor in line 816. Steam and oxygen are supplied through line 818. The flow of gas containing coke fines is routed to separator vessel 806 through line 820 which is connected to a gas outlet of the main gasifier vessel 804. The fines are separated from the gas flow in cyclone system 822 including serially connected primary and secondary cyclones with diplegs which return the separated fines to the separator vessel. The separated fines are then returned to the main gasifier vessel 804 through return line 824 and the fuel gas product taken out by way of line 826. Coke is purged from the separator through line 828. The fuel gas from line 826 can then undergo further processing for separation of $CO_2$ (and/or $H_2S$) and conversion of synthesis gas to methanol.

The coker and gasifier can be operated according to the parameters necessary for the required coking processes. Thus, the heavy oil feed in the coking feedstock will typically be a heavy (high boiling) reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt %, generally from 5 wt % to 50 wt %. In some embodiments, the coking feedstock is a petroleum vacuum residuum.

Coking Conditions—Delayed Coking

In particular embodiments, delayed coking is performed on a waste feedstock optionally combined with a conventional coking feedstock to produce liquid and vapor hydrocarbon products and coke. In various embodiments, the waste feedstock and optional conventional coking feedstock are exposed to delayed coking conditions.

Delayed coking is another coking process for the thermal conversion of heavy oils such as petroleum residua (also referred to as "resid") to produce liquid and vapor hydrocarbon products and coke. In some embodiments, the conventional hydrocarbon feedstock includes resids from heavy and/or sour (high sulfur) crude oils. Delayed coking of the feedstock is carried out by converting part of the feedstock to more valuable hydrocarbon products. The resulting coke has value, depending on its grade, as a fuel (fuel grade coke), electrodes for aluminum manufacture (anode grade coke), etc.

Generally, a feedstock is pumped to a pre-heater where it is pre-heated, such as to a temperature from 480° C. to 520° C. The pre-heated feed is conducted to a coking reactor, typically a vertically oriented, insulated coker vessel, e.g., drum, through an inlet at the base of the drum. Pressure in the drum is usually relatively low, such as 100 kPa-g to 550 kPa-g, or 100 kPa-g to 240 kPa-g to allow volatiles to be removed overhead. Typical operating temperatures of the drum will be between roughly 400° C. to 445° C., but can be as high as 475° C. The hot feed thermally cracks over a period of time (the "coking time") in the coke drum, liberating volatiles composed primarily of hydrocarbon products that continuously rise through the coke bed, which consists of channels, pores and pathways, and are collected overhead. The volatile products are conducted to a coker fractionator for distillation and recovery of coker gases, gasoline boiling range material such as coker naphtha, light gas oil, and heavy gas oil. In an embodiment, a portion of the heavy coker gas oil present in the product stream introduced into the coker fractionator can be captured for recycle and combined with the fresh feed (coker feed component), thereby forming the coker heater or coker furnace charge. In addition to the volatile products, the process also results in the accumulation of coke in the drum. When the coke drum is full of coke, the heated feed is switched to another drum and hydrocarbon vapors are purged from the coke drum with steam. The drum is then quenched with water to lower the temperature down to 95° C. to 150° C., after which the water is drained. When the draining step is complete, the drum is opened, and the coke is removed by drilling and/or cutting using high velocity water jets ("hydraulic decoking").

Figure 9:
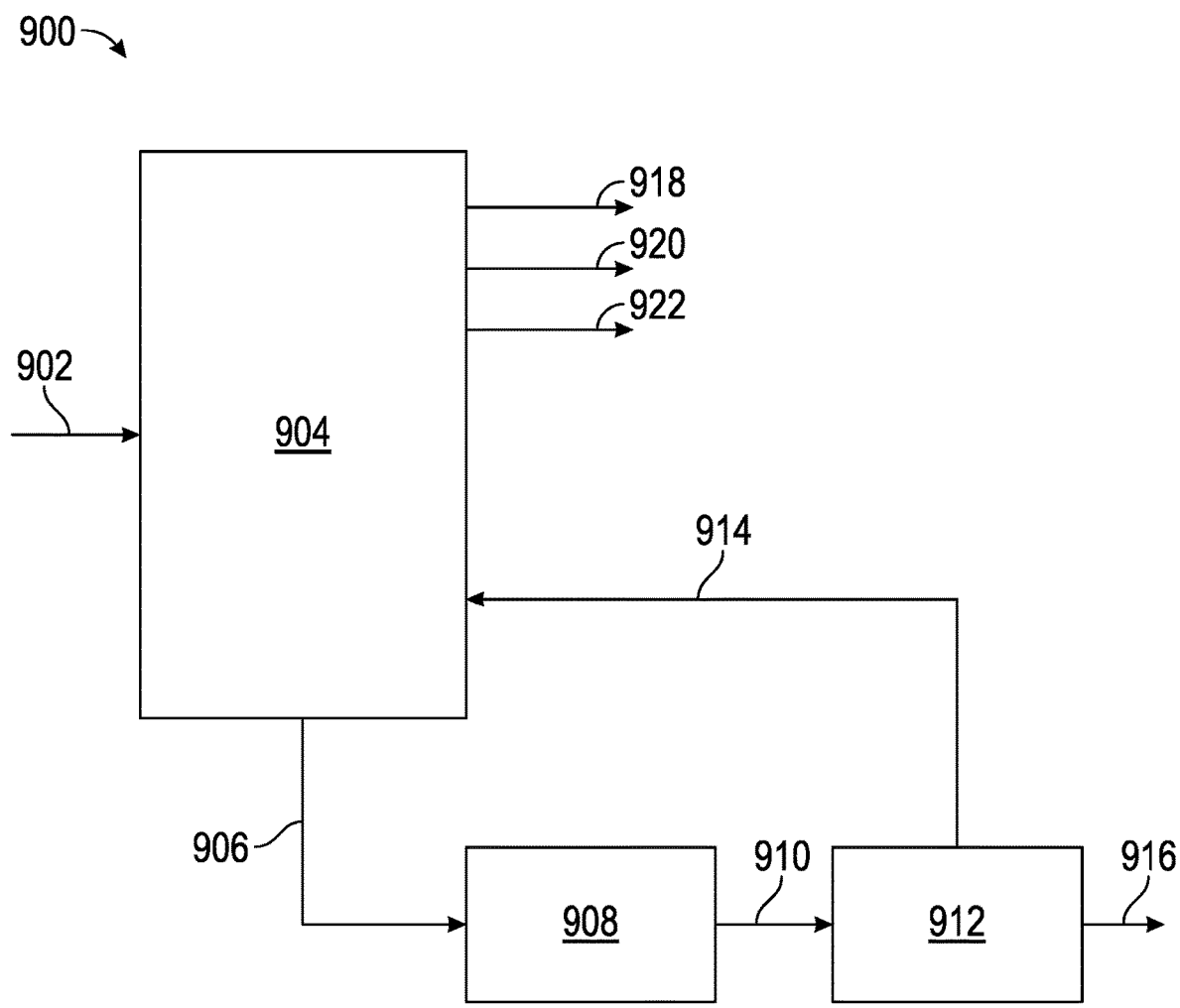
FIG. 9 is an illustrative depiction of a delayed coking system including a coker and a fractionator in accordance with certain embodiments of the present disclosure.

FIG. 9 illustrates an example delayed coking system 900. In the illustrated embodiment, a feedstock 902 including a waste feedstock, which may be preheated, is fed into a coker fractionator 904. In some embodiments, the feedstock 902 further includes a conventional coking feedstock, which may alternatively be separately feed to the coker fractionator 904. In the illustrated embodiment, a fractionator effluent 906 including at least a portion of the waste feedstock and/or conventional coking feedstock is withdrawn from the coker fractionator 904 and fed to a coker furnace 908. From the coker furnace 908, the preheated effluent 910 including a preheated waste feedstock and/or preheated conventional coking feedstock is passed to a coking reactor 912, which includes, for example, a coking vessel or coking drum. The preheated effluent 910 also includes, for example, tower bottoms (or recycle). The coking reactor 912 is operated at coking conditions such that the preheated waste feedstock/ conventional coking feedstock thermally cracks over a period of time (the "coking time") in the coking reactor 912, liberating volatiles composed primarily of hydrocarbon products that continuously rise through the coke bed, which consists of channels, pores and pathways, and are collected overhead as a coker of 914, which is passed to the coker fractionator 904. In the illustrated embodiment, the coker effluent 914 is separated in the coker fractionator 904 into various fractions, including, but not limited to, one or more of a coker gas fraction 91S, a coker naphtha fraction 920, and a coker gas oil fraction 922. It should be understood that separation of the coking products into various fractions can occur in one or more vessels and/or one or more different operations. As previously mentioned, coke is accumulated in the coking reactor 912 (e.g., coking vessel). A coke product 916 including coke is withdrawn from the coking reactor 912.

Chemical Production

In accordance with one or more embodiments, the processing of the polymeric waste results in the production or recovery of chemical products. For example, coker naphtha from coking of polymeric waste can be processed to form chemical products. By way of further example, coker naphtha from coking of pyrolysis oil that is at least partially derived from polymeric waste can be processed to form chemical products.

In some embodiments, the coker gas include one or more components that need to be removed and/or reduced in concentration prior to subsequent processing. For example, embodiments include treating the coker gas to remove at least a portion of contaminants, including halides, acids, and sulfur species. Any of a variety of techniques may be used for treatment of the coker gas, including adsorption, absorption, hydrogenation, and fraction. Adsorption and absorption may be used, for example, to remove select contaminants, such as carbonyl sulfide, carbon dioxide, ammonia, and mercury, among others. Absorption includes solid and liquid contacting methods such as water washing, amine gas treating, caustic treatment. Water washing includes, for example, contacting the coker gas with a water stream. Adsorption includes treatment beds, such as mercury and carbonyl sulfide beds. For example, at least a portion of the carbonyl sulfide can be removed from the coker gas by contact with a carbonyl sulfide adsorbent. Hydrogenation may be used, for example, to remove contaminants, such as acetylenes and oxides, among others. Fractionation may be used, for example, to separate olefins, for example.

The chemical products produced from integration of co-processing of polymeric waste includes a variety of chemical products, including olefins (e.g., alpha-olefins), aromatics, oligomers, and polymers. A "polymer" has one or more repeating units that are the same or different. The term "polymer" as used herein includes oligomers (up to 75 repeating units) and larger polymers (greater than 75 repeating units), "Homopolymer" is a polymer having the same repeating unit. A. "copolymer" is a polymer having two or more repeating units different from each other. A "terpolymer" is a polymer having three repeating units different from each other. "Different" is used to mean that the repeating units differ from each other by at least one atom or isomer. Therefore, the definition of the copolymer used herein includes a terpolymer and the like. The chemical products include or can be processed to form a number of desirable products, including: olefins, such as ethylene, propylene, butylene, butadiene, pentenes, $C_5$ olefins, and $C_5$ di-olefins, as well as longer olefins, such as hexene, nonene, and tetramer; aromatics, such as benzene, styrene, and toluene; cyclohexane; polymers, such as polyethylene, polypropylene, polystyrene, polyesters, poly-vinyl chloride; and di-vinyl chloride; synthetic elastomers and rubbers, such as styrene-butadiene rubber, ethylene-propylene-diene-rubbers, butyl rubbers, and halobutyl rubbers; plastic additives and modifiers, such as plasticizers; epoxies resins; and fluids with multiple applications, such as isopropyl alcohol, oxo-alcohols, glycols, detergents, and lubricants.

At least a portion of these chemical products may be circular chemical products that are attributable to the polymeric waste, such as determined by crediting, allocating, and/or offsetting or substituting for other hydrocarbons in a mass or energy balance for a system, such as in accordance with a third-party certification relating to circularity. At least a portion of these chemical products may be certified circular chemical products that are certified for their circularity by third party certification may be referred to as certified circular.

Various processes may be employed to integrate chemical production with coking. For example, coker naphtha received from coking may be converted in one or more of the following unites: hydroprocessing units, such as hydrocracking and hydrotreating units; fluid catalytic cracking units; steam cracking units; catalytic reforming units; partial oxidation to synthetic gas; and/or isomerization. The chemical products may be directly produced by such processes or may be obtained by further processing, such as separation, treating, and/or cracking of an effluent of such processes. As an example, the chemical products may be obtained by processing of coker naphtha at least partially derived from polymeric waste. In addition, co-processing of polymeric waste as a feed or co-feed into delayed or fluidized coking units (including FLEXICOKING™ units), may result in the attribution of the polymeric waste to chemical products (including olefins, polymers, or aromatics), such as determined by crediting, allocating, and/or offsetting or substituting for other hydrocarbons in a mass or energy balance for a system, such as in accordance with a third-party certification relating to circularity.

Accordingly, processes per various embodiments herein may further include obtaining olefins that have been produced or recovered from the processing of polymeric waste or olefins to which the processing of polymeric waste has been attributed, e.g., for employment in polymerization processes; and polymers of various embodiments described herein may include olefins that have been produced or recovered from the processing of polymeric waste or olefins to which the processing of polymeric waste has been attributed. As an example, at least a portion of the olefin content (e.g., employed in processes and/or included in compositions as described herein) may be from olefins that are produced or recovered directly from the processing of polymeric waste. Similarly, the processing of polymeric waste may be attributed to at least a portion the olefins (e.g., employed in processes and/or included in compositions as described herein).

Additional Embodiments

Accordingly, the present disclosure may provide for the integration of polymeric waste co-processing in cokers to produce circular chemical products from coker gas. The methods and systems may include any of the various features disclosed herein, including one or more of the following statements.

Embodiment 1. A method of producing circular chemical products comprising: providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %; and converting the coker gas into at least a polymer.

Embodiment 2. The method of Embodiment 1, wherein the coker gas is derived from co-processing of polymeric waste and a heavy oil with a T10 distillation point of about 343° C. to about 575° C.

Embodiment 3. The method of Embodiment 1 or Embodiment 2, wherein providing the coker gas comprises: coking a feedstock comprising the polymeric waste and a heavy oil with a T10 distillation point of about 343° C. to about 575° C. to form at least a coker effluent and coke; and separating the coker gas from the coker effluent.

Embodiment 4. The method of Embodiment 3, wherein the polymeric waste comprises plastic waste.

Embodiment 5. The method of Embodiment 3 or Embodiment 4, wherein the heavy oil comprises petroleum vacuum resid.

Embodiment 6. The method of any of Embodiments 3 to 5, wherein the feedstock comprises the polymeric waste in an amount of about 0.1 wt % to about 25 wt %.

Embodiment 7. The method of any of Embodiments 3 to 6, wherein the coking comprises exposing the feedstock to delayed coking conditions.

Embodiment 8. The method of any of Embodiments 1 to 7, wherein providing the coker gas comprises pyrolyzing the polymeric waste to produce at least a pyrolysis oil and then coking at least the pyrolysis oil and a heavy oil with a T10 distillation point of about 343° C. to about 575° C.

Embodiment 9. The method of any of Embodiments 1 to 8, wherein the coker gas comprises oxygen-containing compounds in an amount of about 1 wppm to about 15 wt %, and nitrogen-containing compounds in an amount of about 250 wppm to about 5,000 wppm.

Embodiment 10. The method of any of Embodiments 1 to 9, wherein the polymeric waste comprises plastic waste.

Embodiment 11. The method of any of Embodiments 1 to 10, wherein at least a portion of the polymer is attributable to polymers in the polymeric waste.

Embodiment 12. The method of any of Embodiments 1 to 11, wherein the polymer comprises a circular polymer.

Embodiment 13. The method of any of Embodiments 1 to 12, wherein the polymer is certified circular in accordance with International Sustainability and Carbon Certification.

Embodiment 14. The method of any of Embodiments 1 to 13, wherein the coker gas is further converted into at least one chemical product selected from a $C_6$-$C_{16}$ olefin, an oxo-alcohol, a plasticizer, and combinations thereof Embodiment 15. The method of any of Embodiments 1 to 14, further comprising treating the coker gas to reduce a concentration of one or more contaminants prior to the step of converting the coker gas.

Embodiment 16. The method of Embodiment 15, wherein the treating comprises contacting the coker gas with water in a water wash.

Embodiment 17. The method of any of Embodiments 1 to 16, wherein the converting the coker gas into at least the polymer comprises recovering olefins from the coker gas; and polymerizing at least a portion of the olefins.

Embodiment 18. The method of any of Embodiments 1 to 17, wherein the converting the coker gas into at least the polymer comprises steam cracking at least a portion of the coker gas to form at least a steam cracking effluent, recovering olefins from the steam cracking effluent; and polymerizing at least a portion of the olefins.

Embodiment 19. The method of Embodiment 18, wherein the providing the coker gas comprises providing a gas fraction comprising at least 50 wt % of $C_2$ hydrocarbons, $C_3$ hydrocarbons, $C_4$ hydrocarbons, or combinations thereof Embodiment 20. The method of any of Embodiments 1 to 19, wherein the providing the coker gas comprises providing a $C_3$-$C_4$ fraction, and wherein the method further comprises separating at least a $C_3$ fraction from the $C_2$-$C_4$ gas fraction, recovering olefins from the $C_3$ fraction, and polymerizing at least a portion of the olefins.

Embodiment 21. The method of any of Embodiments 1 to 19, wherein the providing the coker gas comprises providing a $C_3$-$C_4$ fraction, and wherein the method further comprises separating at least a $C_3$ fraction from the $C_3$-$C_4$ fraction, oligomerizing at least a portion of the $C_3$ fraction to form oligomers of propylene, and reacting at least a portion of the oligomers with hydrogen and carbon monoxide to form at least aldehydes.

Embodiment 22. A method of producing circular chemical products comprising: providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %; recovering olefins from the coker gas; and polymerizing at least a portion of the olefins to form at least polyolefins.

Embodiment 23. The method of Embodiment 22, further comprising steam cracking the coker gas, wherein the olefins are recovered from a steam cracking effluent of the coker gas.

Embodiment 24. The method of Embodiment 22 or Embodiment 23, wherein recovering olefins from the coker gas comprises separating at least propylene from $C_3$-$C_4$ hydrocarbons.

Embodiment 25. The method of any of Embodiments 22 to 24, further comprising coking a feedstock comprising the polymeric waste and a heavy oil with a T10 distillation point of about 343° C. to about 575° C. to form at least a coker effluent and coke; and separating the coker gas from the coker effluent.

To facilitate a better understanding of the present invention, the following examples of certain aspects of some embodiments are given. In no way should the following examples be read to limit, or define, the entire scope of the disclosure.

EXAMPLE

In this example, a plastic feedstock and a petroleum vacuum resid were co-processed in a pilot-scale coking unit. Six different plastic feedstocks were tested, identified as Plastic Feed A, Plastic Feed B, Plastic Feed C, Plastic Feed D, Plastic Feed E, and Plastic Feed F. Plastic Feed A was 100% linear low density polyethylene. Plastic Feed B was 100% polypropylene. Plastic Feed C was 100% high density polyethylene. Plastic Feed D was a plastic waste that included 12 wt % of polyvinylidene chloride with the remainder being polyethylene and ethyl vinyl acetate. Plastic Feed E was a plastic waste that included 10 wt % polyamide or nylon with the remainder being polyethylene, ethyl vinyl alcohol, and polyethylene terephthalate. Plastic Feed F was a plastic waste that included pellets of 100% low density polyethylene. The plastic feedstocks were provided in various forms including small granules, shreds (about 1-2 inches in length) or shreds with about 0.25 inches per side. The plastic feedstocks were processed into smaller grounds due to the size requirements and mixing capabilities if the pilot scale coking unit. The plastic feedstocks were fed into the pilot scale coking unit as a homogenous mixture with the petroleum vacuum resid after the plastic feedstock had been melted.

The pilot scale coking unit had the following operating conditions: (1) Pressure=15 psig; (2) Inlet Temperature=930° F. (500° C.); (3) Outlet Temperature=844° F. (avg) (450° C.); (4) Residence Time=5 hours). The compositional data for liquid product (coker effluent) from the pilot-scale coking unit for each test are provided below.

The composition of the coker gas produced in these tests is provided in Table 3 below.

TABLE 3

| Coker Gas Composition | | | | | | | | | | |
|---|---|---|---|---|---|---|---|---|---|---|
| Test | 1 | 2 | 3 | 4 | 5 | 6 | 7 | 8 | 9 | 10 |
| Plastic | — | A | A | B | C | D | D | E | E | F |
| Plastic (wt %) | 0 | 5 | 10 | 10 | 10 | 5 | 10 | 5 | 7.5 | 5 |
| Hydrogen (wt %) | 0.31 | 0.29 | 0.32 | 0.29 | 0.24 | 0.32 | 0.31 | 0.29 | 0.32 | 0.34 |
| Hydrogen Sulfide (wt %) | 1.25 | 1.22 | 1.05 | 1.22 | 0.99 | 1.14 | 0.98 | 1.13 | 0.88 | 1.43 |
| Methane (wt %) | 26.5 | 25.5 | 25.5 | 25.8 | 22.3 | 26.4 | 24.9 | 26.4 | 25.7 | 24.5 |
| Ethane (wt %) | 18.7 | 18.0 | 17.4 | 18.9 | 17.2 | 18.5 | 18.2 | 18.7 | 18.6 | 18.3 |
| Ethylene (wt %) | 4.78 | 5.65 | 6.71 | 5.51 | 5.26 | 5.11 | 5.31 | 4.51 | 5.25 | 5.75 |
| Propane (wt %) | 16.6 | 16.1 | 15.3 | 16.2 | 15.8 | 16.3 | 16.4 | 16.8 | 16.6 | 16.5 |
| Propylene (wt %) | 11.2 | 11.7 | 12.5 | 11.8 | 15.5 | 12.0 | 12.8 | 11.0 | 11.8 | 12.2 |
| n-Butane (wt %) | 9.07 | 8.95 | 8.49 | 8.88 | 7.39 | 8.54 | 8.49 | 9.42 | 8.96 | 8.85 |

TABLE 3-continued

| | Coker Gas Composition | | | | | | | | | |
|---|---|---|---|---|---|---|---|---|---|---|
| Test | 1 | 2 | 3 | 4 | 5 | 6 | 7 | 8 | 9 | 10 |
| IsoButane (wt %) | 1.46 | 1.53 | 1.27 | 1.25 | 1.73 | 1.43 | 1.51 | 1.57 | 1.32 | 1.52 |
| IsoButylene (wt %) | 7.84 | 8.61 | 9.10 | 7.94 | 11.82 | 8.21 | 8.94 | 7.94 | 8.24 | 8.37 |
| trans-2-Butene (wt %) | 1.36 | 1.50 | 1.55 | 1.38 | 1.10 | 1.29 | 1.29 | 1.39 | 1.38 | 1.49 |
| cis-2-Butene (wt %) | 0.91 | 0.89 | 0.87 | 0.91 | 0.75 | 0.85 | 0.85 | 0.92 | 0.92 | 0.80 |

The following summary table is provided to summarize the results from Table 3. In the following tables, the co-processing results for Tests 2-10 are averaged for 5 wt % and 10 wt % plastic.

TABLE 4

| | Coker Gas Summary | | |
|---|---|---|---|
| Test | 1 | CoProcessing | CoProcessing |
| Plastic (wt %) | 0 | 5 | 10 |
| Hydrogen Sulfide (wppm) | 1.3 | 1.2 | 1.1 |
| Hydrogen (wt %) | 0.3 | 0.3 | 0.3 |
| Methane (wt %) | 26.5 | 25.7 | 24.6 |
| Ethane (wt %) | 18.7 | 18.4 | 17.9 |
| Ethylene (wt %) | 4.8 | 5.3 | 5.7 |
| Propane (wt %) | 16.6 | 16.4 | 15.9 |
| Propylene (wt %) | 11.2 | 11.7 | 13.2 |
| Butanes (wt %) | 10.5 | 10.5 | 9.8 |
| Butylenes (wt %) | 10.1 | 10.6 | 11.6 |
| Total Olefin (wt %) | 26.1 | 27.5 | 30.5 |

The above table illustrates that coker gas at least partially derived from polymers, including plastic waste, has a different composition than conventional coker gas. As shown, the sulfur content in the coker gas from co-processing includes less hydrogen sulfide than Test 1 with no polymeric waste. In addition, the coker naphtha from co-processing of the polymers, including plastic waste, also includes less paraffins and more olefins than Test 1 with no polymeric waste.

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description are modified by "about" the indicated value, and take into account experimental error and variations that would be expected by a person having ordinary skill in the art.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

The invention claimed is:

1. A method of producing circular chemical products comprising:
providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %; and
converting the coker gas into at least a polymer.

2. The method of claim 1, wherein the coker gas is derived from co-processing of polymeric waste and a heavy oil with a T10 distillation point of about 343° C. to about 575° C.

3. The method of claim 1, wherein providing the coker gas comprises: coking a feedstock comprising the polymeric waste and a heavy oil with a T10 distillation point of about 343° C. to about 575° C. to form at least a coker effluent and coke; and separating the coker gas from the coker effluent.

4. The method of claim 3, wherein the polymeric waste comprises plastic waste.

5. The method of claim 3, wherein the heavy oil comprises petroleum vacuum resid.

6. The method of claim 3, wherein the feedstock comprises the polymeric waste in an amount of about 0.1 wt % to about 25 wt %.

7. The method of claim 3, wherein the coking comprises exposing the feedstock to delayed coking conditions.

8. The method of claim 1, wherein providing the coker gas comprises pyrolyzing the polymeric waste to produce at least a pyrolysis oil and then coking at least the pyrolysis oil and a heavy oil with a T10 distillation point of about 343° C. to about 575° C.

9. The method of claim 1, wherein the coker gas comprises oxygen-containing compounds in an amount of about 1 wppm to about 15 wt %, and nitrogen-containing compounds in an amount of about 250 wppm to about 5,000 wppm.

10. The method of claim 1, wherein the polymeric waste comprises plastic waste.

11. The method of claim 1, wherein at least a portion of the polymer is attributable to polymers in the polymeric waste.

12. The method of claim 1, wherein the polymer comprises a circular polymer.

13. The method of claim 1, wherein the polymer is certified circular in accordance with International Sustainability and Carbon Certification.

14. The method of claim 1, wherein the coker gas is further converted into at least one chemical product selected from a $C_6$-$C_{16}$ olefin, an oxo-alcohol, a plasticizer, and combinations thereof.

15. The method of claim 1, further comprising treating the coker gas to reduce a concentration of one or more contaminants prior to the step of converting the coker gas.

16. The method of claim 15, wherein the treating comprises contacting the coker gas with water in a water wash.

17. The method of claim 1, wherein the converting the coker gas into at least the polymer comprises recovering olefins from the coker gas; and polymerizing at least a portion of the olefins.

18. The method of claim 1, wherein the converting the coker gas into at least the polymer comprises steam cracking at least a portion of the coker gas to form at least a steam cracking effluent, recovering olefins from the steam cracking effluent; and polymerizing at least a portion of the olefins.

19. The method of claim 18, wherein the providing the coker gas comprises providing a gas fraction comprising at least 50 wt % of $C_2$ hydrocarbons, $C_3$ hydrocarbons, $C_4$ hydrocarbons, or combinations thereof.

20. The method of claim 1, wherein the providing the coker gas comprises providing a $C_3$-$C_4$ fraction, and wherein the method further comprises separating at least a $C_3$ fraction from the $C_2$-$C_4$ gas fraction, recovering olefins from the $C_3$ fraction, and polymerizing at least a portion of the olefins.

21. The method of claim 1, wherein the providing the coker gas comprises providing a $C_3$-$C_4$ fraction, and wherein the method further comprises separating at least a $C_3$ fraction from the $C_3$-$C_4$ fraction, oligomerizing at least a portion of the $C_3$ fraction to form oligomers of propylene, and reacting at least a portion of the oligomers with hydrogen and carbon monoxide to form at least aldehydes.

22. A method of producing circular chemical products comprising:
providing a coker gas that is at least partially derived from polymeric waste, wherein the coker gas has an olefin content of about 10 wt % to about 30 wt %, a sulfur content of about 0.5 wt % to about 5 wt %, and a total halide content of about 1 wppm to about 150 wppm; and oxygen-containing compounds in an amount of about 0.5 wt % to about 15 wt %;
recovering olefins from the coker gas; and
polymerizing at least a portion of the olefins to form at least polyolefins.

23. The method of claim 22, further comprising steam cracking the coker gas, wherein the olefins are recovered from a steam cracking effluent of the coker gas.

24. The method of claim 22, wherein recovering olefins from the coker gas comprises separating at least propylene from $C_3$-$C_4$ hydrocarbons.

25. The method of claim 22, further comprising coking a feedstock comprising the polymeric waste and a heavy oil with a T10 distillation point of about 343° C. to about 575° C. to form at least a coker effluent and coke; and separating the coker gas from the coker effluent.

\* \* \* \* \*